United States Patent
Long

(10) Patent No.: US 9,755,954 B2
(45) Date of Patent: Sep. 5, 2017

(54) AUTOMATIC PROTECTION SWITCHING METHOD, DEVICE AND SYSTEM

(71) Applicant: Huawei Technologies Co., Ltd., Shenzhen (CN)

(72) Inventor: Hao Long, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 245 days.

(21) Appl. No.: 14/598,873

(22) Filed: Jan. 16, 2015

(65) Prior Publication Data

US 2015/0131432 A1   May 14, 2015

Related U.S. Application Data

(63) Continuation of application No. 13/404,793, filed on Feb. 24, 2012, now Pat. No. 9,042,228, which is a (Continued)

(30) Foreign Application Priority Data

Aug. 25, 2009 (CN) .......................... 2009 1 0091787

(51) Int. Cl.
*H04L 12/26* (2006.01)
*H04L 12/707* (2013.01)
(Continued)

(52) U.S. Cl.
CPC .......... *H04L 45/24* (2013.01); *H04L 41/0654* (2013.01); *H04L 41/5025* (2013.01);
(Continued)

(58) Field of Classification Search
CPC ..... H04L 12/26; H04L 41/06; H04L 41/0654; H04L 45/28; H04L 49/50
(Continued)

(56) References Cited

U.S. PATENT DOCUMENTS 5,933,422 A * 8/1999 Kusano .............. H04Q 11/0478
                                                      340/2.9
7,340,169 B2 * 3/2008 Ovadia ................... H04L 45/62
                                                       398/45
(Continued)

FOREIGN PATENT DOCUMENTS

CN          1881890 A1    12/2006
CN        101291276 A     10/2008
(Continued)

OTHER PUBLICATIONS

Sharma, V. et al. "Framework for Multi-Protocol Label Switching (MPLS)-based Recovery," Network Working Group, The Internet Society, Feb. 2003, 42 pgs.

*Primary Examiner* — Dmitry H Levitan
(74) *Attorney, Agent, or Firm* — Brinks, Gilson & Lione

(57) ABSTRACT

Embodiments of the present invention provide a protection switching method, comprises: determining that the bandwidth of at least one of the transmission paths changes; obtaining a final path bandwidth combination according to the bandwidth of the transmission path whose bandwidth changes, wherein the final path bandwidth combination is formed by bandwidths of the at least two transmission paths after the bandwidth of at least one transmission path changes; querying the stored mapping relationship between the path bandwidth combination and the channel allocation policy according to the final path bandwidth combination, and determining the channel allocation policy corresponding to the final path bandwidth combination; and performing channel switching according to the channel allocation policy corresponding to the final path bandwidth combination.

16 Claims, 15 Drawing Sheets

Related U.S. Application Data continuation of application No. PCT/CN2010/072860, filed on May 17, 2010.

(51) Int. Cl.
*H04L 12/24* (2006.01)
*H04L 12/729* (2013.01)
*H04W 40/00* (2009.01)
*H04L 12/725* (2013.01)

(52) U.S. Cl.
CPC ........ *H04L 43/0882* (2013.01); *H04L 45/125* (2013.01); *H04L 45/22* (2013.01); *H04L 45/306* (2013.01); *H04W 40/00* (2013.01)

(58) Field of Classification Search
USPC .................................. 370/216, 225, 228, 248
See application file for complete search history.

(56) References Cited

U.S. PATENT DOCUMENTS

| | | | |
|---|---|---|---|
| 8,705,350 B2 * | 4/2014 | Khasnabish | ............ H04L 45/00 370/230 |
| 2001/0050789 A1 | 12/2001 | Jung | |
| 2003/0216141 A1 | 11/2003 | Antoniou et al. | |
| 2004/0081081 A1 | 4/2004 | Colombo | |
| 2006/0239271 A1 | 10/2006 | Khasnabish et al. | |
| 2007/0195715 A1 * | 8/2007 | Yamano | ................ H04W 40/04 370/254 |
| 2009/0041015 A1 | 2/2009 | Zhang | |
| 2009/0316723 A1 * | 12/2009 | Kobatake | .............. H04J 3/1682 370/468 |
| 2010/0265826 A1 | 10/2010 | Khasnabish et al. | |
| 2010/0265831 A1 | 10/2010 | Hachiya et al. | |
| 2012/0163224 A1 | 6/2012 | Long | |

FOREIGN PATENT DOCUMENTS

| | | |
|---|---|---|
| CN | 101340381 A | 1/2009 |
| CN | 101447929 A | 6/2009 |
| CN | 101645797 A | 2/2010 |
| EP | 0 579 040 A2 | 6/1993 |
| EP | 1 703 655 A1 | 9/2006 |
| EP | 1 838 054 A1 | 9/2007 |
| EP | 2 464 055 A1 | 6/2012 |
| JP | 07212358 A | 8/1995 |
| JP | 2006/287549 A | 10/2006 |
| RU | 2 284 662 C2 | 9/2006 |
| RU | 2 327 293 C2 | 6/2008 |
| WO | WO 2009/090723 A1 | 7/2009 |
| WO | WO 2010/022792 A1 | 3/2010 |
| WO | WO 2011/022998 A1 | 3/2011 |
| WO | WO 2012/022792 A1 | 2/2012 |

* cited by examiner

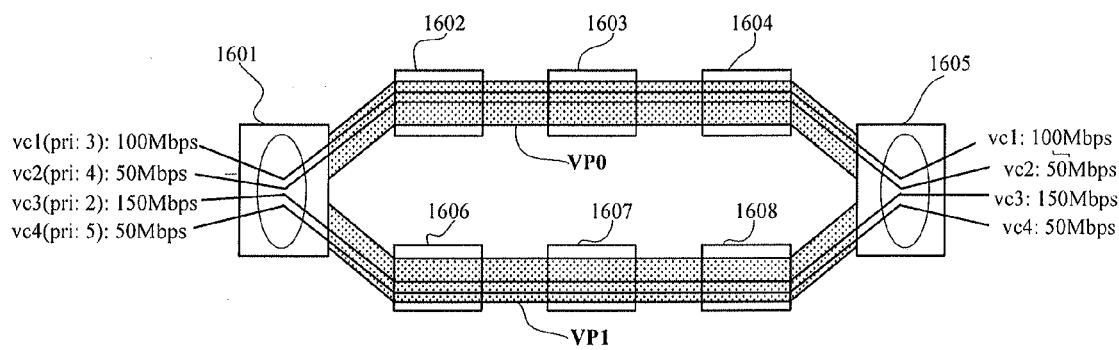
FIG. 19-1
|  | c1 | c2 | c3 | c4 | c5 | c6 | c7 | c8 | c9 | c10 | c11 | c12 |
|---|---|---|---|---|---|---|---|---|---|---|---|---|
| vp0 | 200 | 200 | 200 | 150 | 150 | 150 | 100 | 100 | 100 | 50 | 50 | 50 |
| vp1 | 200 | 150 | 100 | 200 | 150 | 100 | 200 | 150 | 100 | 200 | 150 | 100 |
FIG. 19-2
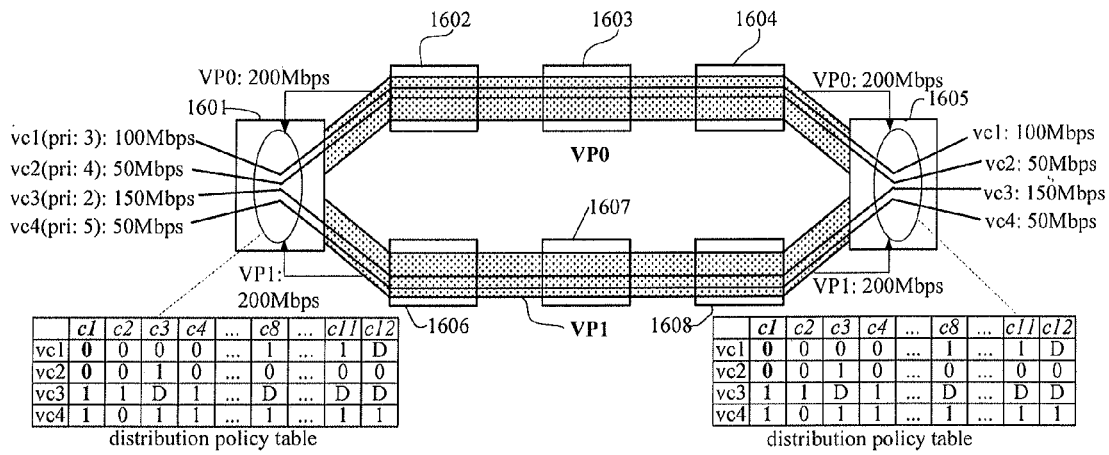
FIG. 20

AUTOMATIC PROTECTION SWITCHING METHOD, DEVICE AND SYSTEM

CROSS-REFERENCE TO RELATED APPLICATIONS

This application is a continuation of U.S. patent application Ser. No. 13/404,793, filed on Feb. 24, 2012, which is a continuation of International Application No. PCT/CN2010/072860, filed on May 17, 2010. The International application claims priority to Chinese Patent Application No. 200910091787.6, filed on Aug. 25, 2009. The afore-mentioned patent applications are hereby incorporated by reference in their entireties.

FIELD OF THE INVENTION

The embodiments of the present invention relates to communications technologies, and in particular, to an automatic protection switching method, device, and system.

BACKGROUND OF THE INVENTION

A packet transport network (Packet Transport Network, PTN for short) of a communication system uses a link formed by network element nodes to transmit a data packet of a service. To avoid that failure of a part of nodes or links affects service transmission, an automatic protection switching (Automatic Protection Switching, APS) technology is put forward in an existing PTN. That is, a service on a faulty link is switched to a preset standby link for transmission, thereby not affecting service transmission.

Microwave is a type of transmission medium between nodes on a link, and currently is widely applied in an operator network. The synchronous digital hierarchy (Synchronous Digital Hierarchy, SDH for short) technology and the plesiochronous digital hierarchy (Plesiochronous Digital Hierarchy, PDH for short) technology are much more commonly used, and an E1 service is mainly transmitted. In recent years, an IP service gradually replaces the E1 services, and occupies most of traffic in the network, and the requirement for bandwidth sharply increases. Under such circumstances, since traditional PDH and SDH microwaves cannot well support the IP service, the PDH and SDH microwaves are gradually replaced by a packet microwave technology. A microwave link has a relatively special attribute, which is called adaptive modulation (Adaptive Modulation, AM for short). A node that transmits data based on the microwave may change the modulation mode automatically according to the change of current environment. This may lead to the bandwidth change of the microwave link, but may ensure a low bit error rate of service transmission.

During the study of the present invention, the inventor finds that applying the APS technology in a PTN network that includes a microwave link has the defects as follows. For the existing APS technology, in normal case, a protected service is transmitted on a working path, and an unprotected service or no service is transmitted on a protection path; when a failure occurs, all protected services are switched to the protection path for transmission. However, in one aspect, due to the AM feature, a microwave link can still transmit a part of services after the bandwidth is adjusted, and service switching may lead to packet loss, which deteriorates service transmission efficiency and service quality; in another aspect, if the microwave link exists on both the working path and the protection path, and the bandwidth on the protection path also decreases, probably the bandwidth requirement of all switched services cannot be met.

SUMMARY OF THE INVENTION

Embodiments of the present invention provide an automatic protection switching method, device, and system, so as to improve efficiency and quality of service transmission that is based on an automatic protection switching technology.

An embodiment of the present invention provides an automatic protection switching method, including:

determining, by a network edge node according to change of bandwidth, a part of services on a first transmission path or a second transmission path as to-be-switched service(s) when monitoring that the bandwidth of the first transmission path changes; and switching, by the network edge node, the to-be-switched service(s) between links on the second transmission path and the first transmission path.

An embodiment of the present invention further provides another automatic protection switching method, including:

receiving, by a network edge node, a partial switching message from a peer network edge node of the network edge node through a first transmission path or a second transmission path; and determining, by the network edge node according to indication information about to-be-switched service(s) or bandwidth change information in the partial switching message, a part of services on the first transmission path or the second transmission path as to-be-switched service(s), and switching the to-be-switched service(s) between links on the second transmission path and the first transmission path.

An embodiment of the present invention provides an automatic protection switching device, including:

a determining module, configured to determine a part of services on a first transmission path or a second transmission path as to-be-switched service(s) according to change of bandwidth when a network edge node monitors that bandwidth of the first transmission path changes; and a switching module, configured to switch the to-be-switched service(s) between links on the second transmission path and the first transmission path.

An embodiment of the present invention provides another automatic protection switching device, including:

a message receiving module, configured to receive a partial switching message from a peer network edge node through a first transmission path or a second transmission path; and a service switching module, configured to determine, according to indication information about the to-be-switched service(s) or bandwidth change information in the partial switching message, a part of services on the first transmission path or the second transmission path as to-be-switched service(s), and switch the to-be-switched service(s) between links on the second transmission path and the first transmission path.

An embodiment of the present invention provides an automatic protection switching system, including a first network edge node and a second network edge node, and a second transmission path and a first transmission path exists between the first network edge node and the second network edge node through intermediate nodes.

The first network edge node is configured to: determine a part of services on the first transmission path or the second transmission path as to-be-switched service(s) according to change of bandwidth when monitoring that the bandwidth change of the first transmission path; switch the to-be-switched service(s) between links on the second transmission path and the first transmission path; and send a partial switching message to the second network edge node at the peer end of the first transmission path or the second transmission path, where the partial switching message includes at least indication information about the to-be-switched service(s) or bandwidth change information.

The second network edge node is configured to: receive the partial switching message from the first network edge node through the first transmission path or the second transmission path; and determine a part of services on the first transmission path or the second transmission path as to-be-switched service(s) according to the indication information about the to-be-switched service(s) or the bandwidth change information in the partial switching message, and switch the to-be-switched service(s) between links on the first transmission path and the second transmission path.

It can be seen from the forgoing technical solution that, according to the embodiments of the present invention, a technology that performs protection switching for a part of services when the bandwidth of the transmission path changes is used, so as to reasonably utilize the bandwidth resources of the first transmission path and the second transmission path, reduce the service switching volume, and reduce packet loss caused by the switching. Moreover, the load is reasonably shared between the first transmission path and the second transmission path, so that efficiency and quality of service transmission are improved.

BRIEF DESCRIPTION OF THE DRAWINGS

FIG. 19-1 is a diagram of a scenario of an automatic protection switching method according to an embodiment of the present invention;

FIG. 19-2 is a diagram of a mapping relationship between a channel allocation policy index and a path bandwidth combination;

FIG. 20 is a diagram of a scenario of channel allocation in a normal state according to an embodiment of the present invention;

DETAILED DESCRIPTION OF THE EMBODIMENTS

The technical solutions in the embodiments of the present invention are clearly and completely described below with reference with the accompanying drawings. Evidently, the embodiments to be described are merely a part rather than all of embodiments of the present invention. All other embodiments obtained by persons of ordinary skill in the art based on the embodiments of the present invention without creative efforts should fall within the protection scope of the present invention.

Embodiment 1

Figure 1:
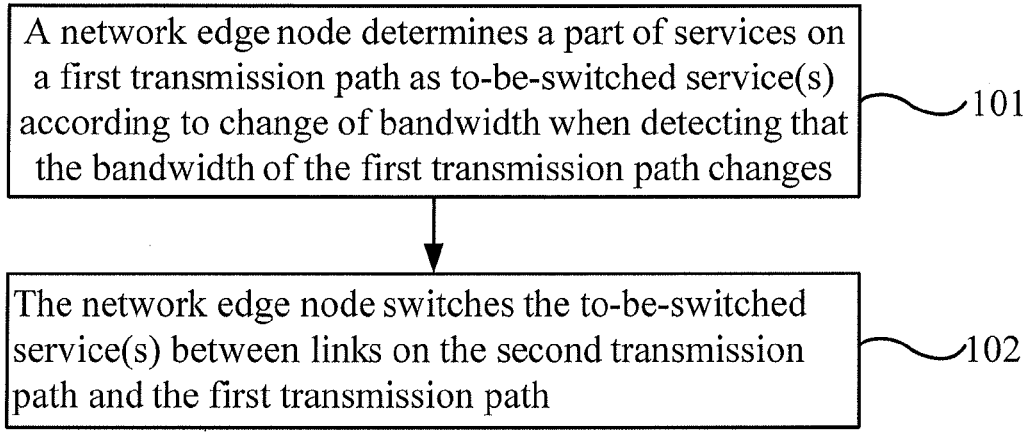
FIG. 1 is a flow chart of an automatic protection switching method according to Embodiment 1 of the present invention.

FIG. 1 is a flow chart of an automatic protection switching method according to Embodiment 1 of the present invention. In a network applying an APS technology, generally at least one protection path and one working path are included. In this embodiment and all the following embodiments, the first transmission path may be a working path, and the second transmission path may be a protection path. Accordingly, when the first transmission path is a protection path, the second transmission path is a working path. Both ends of the second transmission path and the first transmission path are converged to two network edge nodes. These two network edge nodes are configured with a transmitting/receiving selection apparatus, so as to implement protection switching, namely, to determine the path for transmitting the protected service. The method in this embodiment specifically may be performed by either network edge node, and includes the following steps:

Step 101: The network edge node determines a part of services on the first transmission path or the second transmission path as to-be-switched service(s) according to bandwidth change information when monitoring that the bandwidth of the first transmission path changes. Bandwidth change information specifically may be a changed bandwidth value or a bandwidth change value, or may be identified as a change trend of the bandwidth, and so on.

Step 102: The network edge node switches the to-be-switched service(s) between links on the second transmission path and the first transmission path.

Through the technical solution of the present invention, bandwidth change of the first transmission path is a protection switching trigger condition for triggering partial switching of the service. Instead of performing protection switching for all services on the first transmission path or the second transmission path uniformly, it is necessary to select the to-be-switched service(s) among the services on the first transmission path or the second transmission path according to the bandwidth change. Therefore, through the technical solution of this embodiment, automatic protection switching of partial protected services may be implemented according to specific conditions; the load may be reasonably distributed between links on the first transmission path and the second transmission path; the transmission resources of the first transmission path and the second transmission path are fully used; and quality and efficiency of protected service transmission are improved.

Trigger conditions of protection switching are not limited to monitored bandwidth change of the link. The protection switching may also be triggered by receiving a bandwidth change notification, or by transmission condition change or transmission requirement change, where the change is indicated by other network elements or nodes. The to-be-switched service(s) may be determined in different ways. For example, if the protection switching trigger condition is bandwidth value change, the to-be-switched service(s) may be determined according to the current bandwidth value of the first transmission path, or the to-be-switched service(s) may be determined by considering the current bandwidth value of the first transmission path and the bandwidth value of the second transmission path at the same time; if the protection switching trigger condition is a notification message sent by other network elements, the to-be-switched service(s) may be determined according to an indication carried in the notification message; or, when a protection switching trigger condition occurs, the to-be-switched service(s) may be determined according to the type or identifier of the protection switching trigger condition and a locally pre-stored policy.

On the basis of this embodiment, a partial switching message may further be sent to the peer network edge node of the network edge node on the first transmission path or the second transmission path after the network edge node switches the to-be-switched service(s) between the second transmission path and the first transmission path. The partial switching message includes at least indication information about the to-be-switched service(s) or bandwidth change information, and is used to instruct the peer network edge node to determine the to-be-switched service(s) according to the partial switching message and to switch the to-be-switched service(s) between links on the second transmission path and the first transmission path. The partial switching message is preferably sent through a protection path, and therefore, may be carried by an APS message. In the current APS technology, the network edge node sends an APS message to the protection path, so as to ensure the bidirectionality of the automatic protection switching. In this embodiment, the partial switching message may be born in an APS message, and the switching indication information may be extended and carried in the APS message, so as to make the partial switching bidirectional.

The partial switching message is used to inform the network edge node at the other side to perform the corresponding partial automatic protection switching. According to the indication information about the to-be-switched, for example, a service identifier, a list of service identifiers, a service type, or service priority, the service that matches the indication information about the to-be-switched service(s) is determined as the to-be-switched service(s) and is switched. When the indication information is a service identifier, the service with a corresponding service identifier is the service that matches the indication information. When the indication information is a service type, the service that belongs to a same type is the service that matches the indication information. Through the foregoing technical solution, bidirectional automatic protection switching of the service may be achieved.

The service mentioned here refers to traffic born on the transmission path, or may be a client service; in a Multi-Protocol label switching (Multi-Protocol Label Switching, MPLS for short) network, the service may be traffic of a pseudowire (Pseudowire, PW for short), or traffic of a label switching path (Label Switching Path, LSP for short) of an inner-layer nesting; and in an Ethernet, the service may also be traffic of an inner-layer virtual local area network (Virtual Local Area Network, VLAN for short). For ease of description, "service" is used to represent these traffic types in the present invention.

Embodiment 2

Figure 2:
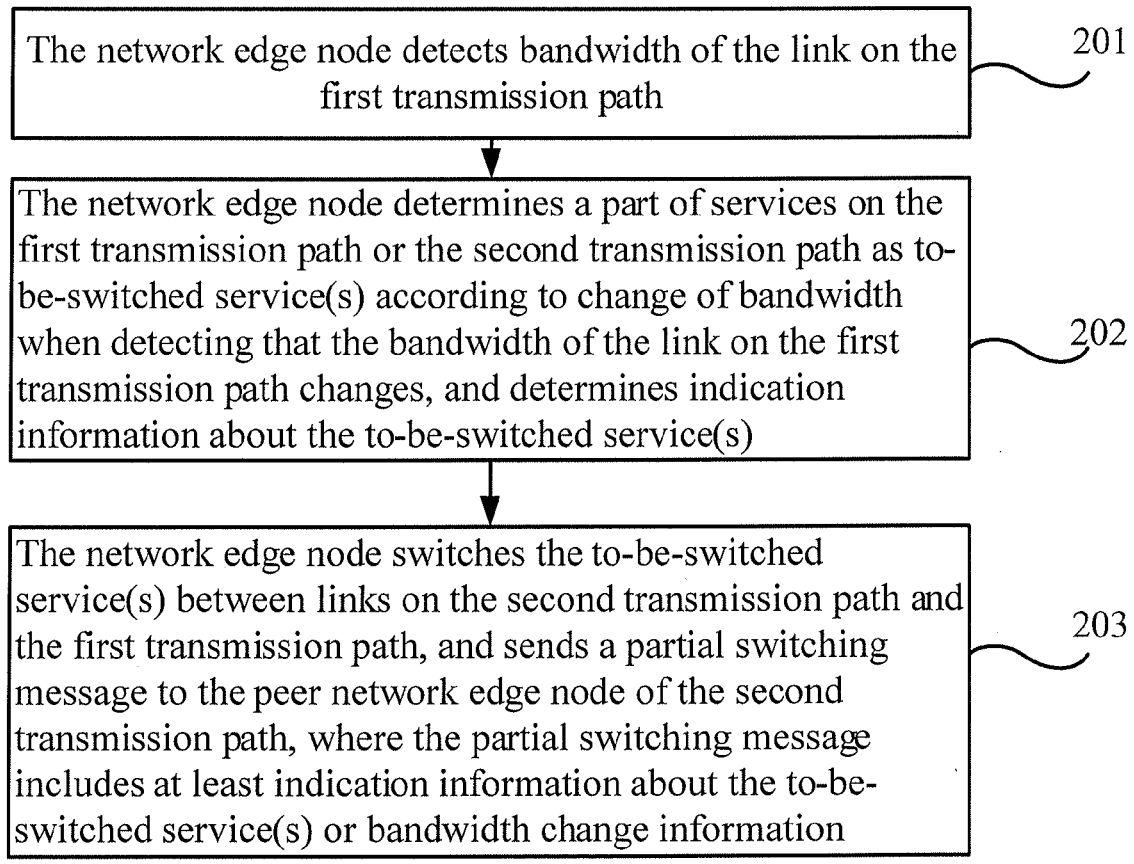
FIG. 2 is a flow chart of an automatic protection switching method according to a Embodiment 2 of the present invention.

FIG. 2 is a flow chart of an automatic protection switching method according to Embodiment 2 of the present invention. This embodiment may be based on embodiment 1 above. Specifically, partial automatic protection switching is triggered according to change of bandwidth. The first transmission path may be a working path, and the second transmission path may be a protection path. The method includes the following steps:

Step 201: The network edge node monitors bandwidth of the link on the first transmission path.

Step 202: The network edge node determines a part of services on the first transmission path or the second transmission path as to-be-switched service(s) according to change of the bandwidth when monitoring that the bandwidth of the link on the first transmission path changes; meanwhile, the network edge node may also determine the indication information about the to-be-switched service(s) according to bandwidth change of the first transmission path.

Step 203: The network edge node switches the to-be-switched service(s) between links on the second transmission path and the first transmission path, and may further send a partial switching message to the peer network edge node of the second transmission path, where the partial switching message includes at least indication information about the to-be-switched service(s) or bandwidth change information.

Through the technical solution of the present invention, the network edge node may switch the part of services that match the protection switching policy according to bandwidth change of the first transmission path. When the bandwidth decreases, the service may be switched from the first transmission path to the second transmission path; when the bandwidth of the first transmission path increases, the service may be switched from the second transmission path to the first transmission path. When switching the service, the network edge node further sends indication information capable of identifying the to-be-switched service(s) to the first transmission path or the second transmission path. The indication information is sent to the peer network edge node of the network edge node, so that the peer network edge node is triggered to switch the service according to the indication information. In this way, bidirectional service protection switching is achieved.

Through the technical solution of the embodiments of the present invention, merely a part of protected services is switched according to the bandwidth when the link bandwidth changes, which avoids that all protected services are switched. The first transmission path may also transmit a part of protected services, so that the switching traffic volume and the packet loss caused by the switching are reduced. In another aspect, the original transmission efficiency of the second transmission path is not affected by too many protected services transmitted on the second transmission path.

The operation of determining the to-be-switched service(s) and the indication information about the to-be-switched service(s) in step 202 above may be: determining by querying the pre-stored protection switching policy according to bandwidth change.

In this embodiment, the protection switching policy may be pre-stored in each network edge node, and the protection switching policy includes a mapping relationship between the changed bandwidth value or the change value of the bandwidth, the to-be-switched service, and the indication information about the to-be-switched service. For example, the protection switching policy includes a mapping relationship between the stored bandwidth value and the priority value, and the services are distinguished according to the priority value. A switching rule may further be stored in the protection switching policy. For example, a service with priority greater than or higher than a priority value is switched to the first transmission path, and a service with priority lower than the priority value is switched to the second transmission path.

Specific content of the protection switching policy is not limited thereto. For example, the indication information about the to-be-switched service(s) may be a switching proportion, and the switching rule is to switch a certain proportion of protected services to the second transmission path or the first transmission path when the bandwidth value reaches a certain value. The content of the protection switching policy may be set according to specific requirements. The protection switching policy may be preset and then stored in each network edge node, or the protection switching policy is provided for the network edge node on one side through a trigger condition that is in the form of a notification, and then the protection switching policy is carried a partial switching message and sent to the peer network edge node.

In practical applications, the automatic protection switching of partial services is not necessarily triggered by monitoring the bandwidth of the link on the first transmission path, but may also be triggered by monitoring the bandwidth of the link on the second transmission path. When it is monitored that the bandwidth of the link on the first transmission path changes, the protection switching policy may be queried to determine the to-be-switched service(s) and the indication information about the to-be-switched service(s) according to bandwidth change.

Alternatively, the bandwidth of the link on the first transmission path and the bandwidth of the link on the second transmission path may also be monitored simultaneously to determine the to-be-switched service(s).

This technical solution is especially applicable to the case that a microwave link is involved. The network edge node monitors the bandwidth of the link on the first transmission path, that is, monitors bandwidth change of the microwave link on the first transmission path caused by adaptive modulation due to environment change. Specifically, when such phenomenon as environment change occurs, the network edge node that interacts with the neighboring node in a form of a microwave will change the modulation mode due to the AM feature, thereby changing the bandwidth. Therefore, the network edge node may acquire the change of the local bandwidth. At this time, if the bandwidth decreases, it does not mean that the link fails, and a part of services may still be transmitted. Therefore, the network edge node may switch a part of protected services to the second transmission path according to the technical solution of this embodiment, so that the network load is shared by the second transmission path and the first transmission path, and the bandwidth resources of the network are fully used.

Embodiment 3

Figure 3:
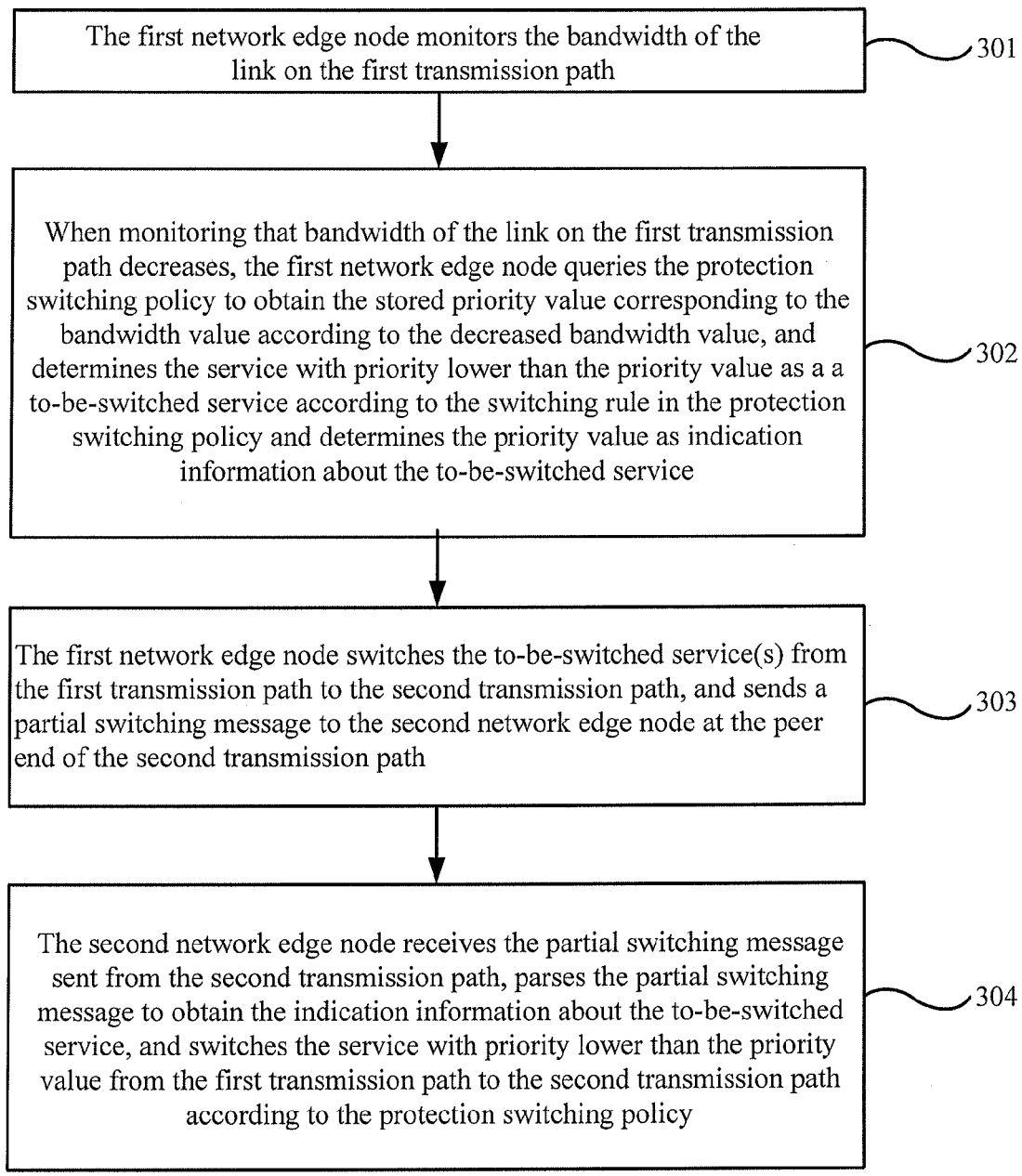
FIG. 3 is a flow chart of an automatic protection switching method according to a Embodiment 3 of the present invention.
Figure 4:
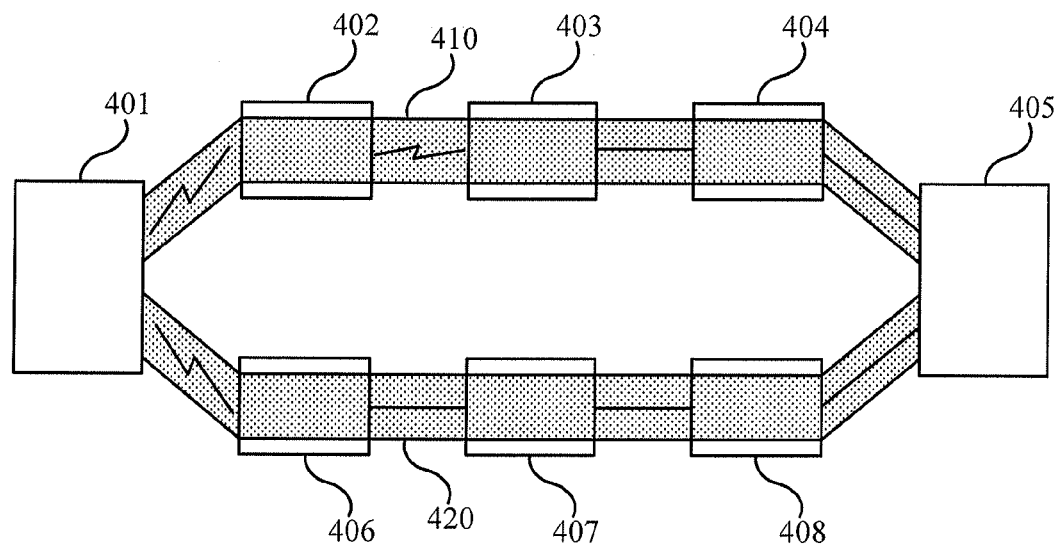
FIG. 4 is a schematic diagram of automatic protection switching network architecture according to an embodiment of the present invention.
Figure 5:
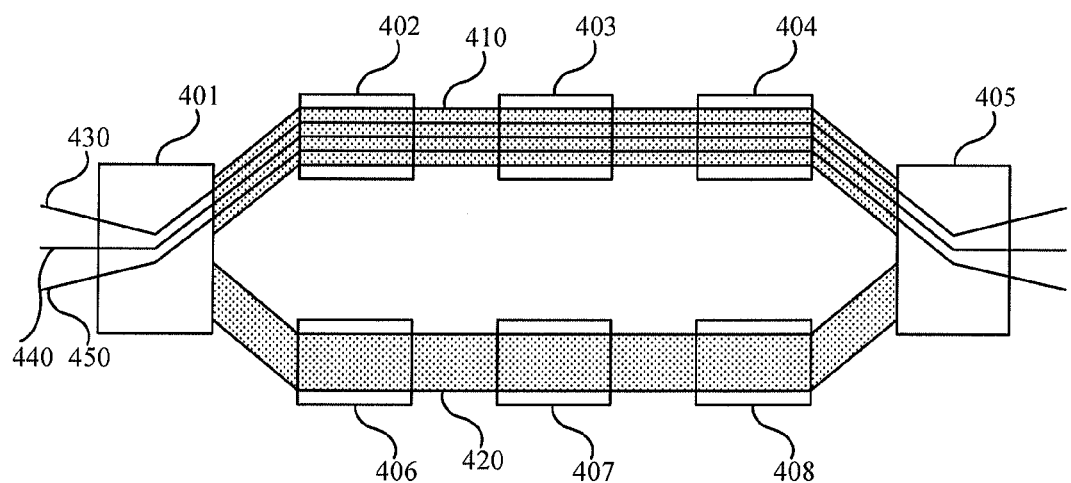
FIG. 5 is a schematic diagram of a normal transmission state in automatic protection switching network architecture according to an embodiment of the present invention.

FIG. 3 is a flow chart of an automatic protection switching method according to Embodiment 3 of the present invention. The APS method in this embodiment may be implemented based on the link arrangement shown in FIG. 4. The APS may include several modes: 1:1, 1:n, and m:n mode. 1:1 refers to one protection path and one working path, where the working path is known as a first transmission path, and the protection path is known as a second transmission path. 1:n refers to one second transmission path and n first transmission paths. m:n refers to m second transmission paths and n first transmission paths, where m and n are natural numbers. The 1:1 mode is taken as an example for illustration. FIG. 4 is a schematic diagram of an automatic protection switching network architecture according to an embodiment of the present invention. As shown in FIG. 4, the links between multiple intermediate nodes form two paths; one is set as the first transmission path 410; and the other is set as the second transmission path 420. The nodes converged at both ends of the first transmission path 410 and the second transmission path 420 are network edge nodes. All nodes are packet switching nodes. A transmission medium, or also known as a transmission mode, between nodes may vary. For example, the transmission medium between the first network edge node 401 and the first intermediate node 402 and the fourth intermediate node 406 or between the first intermediate node 402 and the second intermediate node 403 is a microwave link. Other media are used as transmission links between the second network edge node 405, the third intermediate node 404, the fifth intermediate node 407, and the sixth intermediate node 408. It is assumed that, packets of three protected services, that is, first service 430, second service 440, and third service 450, are transmitted between the first network edge node 401 and the second network edge node 405, as shown in FIG. 5. Specifically, the MPLS network is taken as an example. The first transmission path 410 and the second transmission path 420 are LSPs. The service mentioned here may be a pseudowire, or a client signal before pseudowire encapsulation. If the service is in a pseudowire mode, the corresponding pseudowire priority needs to be configured as service priority for each pseudowire at the network edge node; if the service is in a client signal mode, the corresponding service priority needs to be configured for each service at the network edge node. For the MPLS network, the pseudowire mode is recommended, and the switching is performed according to the pseudowire.

This embodiment may be based on the second embodiment, and specifically is performed by the first network edge node 401 shown in FIG. 4. This embodiment includes the following steps:

Step 301: The first network edge node 401 monitors the bandwidth of the link on the first transmission path 410. Specifically, the first network edge node 401 monitors whether the bandwidth of the microwave link to the first intermediate node 402 changes due to modulation mode change. If the bandwidth of the microwave link between other nodes on the first transmission path 410 changes due to change of the modulation mode, other nodes may send a notification message to the first network edge node 401 to notify change of the bandwidth.

Step 302: When monitoring that the bandwidth of the link on the first transmission path 410 decreases, for example, a bandwidth value decreases from an original bandwidth value 1 Gbps to 0.6 Gbps, the first network edge node 401 queries a stored priority value corresponding to the value in the protection switching policy according to the current bandwidth value after a decrease, determines the service with priority lower than the priority value as the service to be switched from the first transmission path 410 to the second transmission path 420 according to the switching rule in the protection switching policy, and determines the priority value as indication information about the to-be-switched service, where the switching rule is pre-stored in the protection switching policy. The switching rule includes at least an indication information that instructs the network edge node to determine the service with priority lower than the priority value as the service to be switched from the first transmission path to the second transmission path, and to determine the priority value as indication information about the to-be-switched service.

Specifically, the protection switching policy may be pre-stored in the network edge node, and the priority value may be set according to a decrement of bandwidth or a decrement range of bandwidth, or a decreased bandwidth value or a value range of bandwidth decrease. For example, when the bandwidth decreases to 0.6 Gbps, the corresponding queried priority value is set to 4. Service priority is set for each service respectively, and may be carried in a packet of the service; or, the network edge node queries the protection switching policy to obtain the priority value corresponding to the bandwidth value according to bandwidth change, and then queries and identifies the service priority corresponding to each service locally, so that the service priority can be compared with the queried priority value. For example, the service priority of the first service 430 is set to 7; the service priority of the second service 440 is set to 3; and the service priority of the third service 450 is set to 5. Therefore, it is determined that the service priority of the second service 440 is lower than 4, the second service 440 is a to-be-switched service, and the priority value 4 is indication information about the to-be-switched service.

Figure 6:
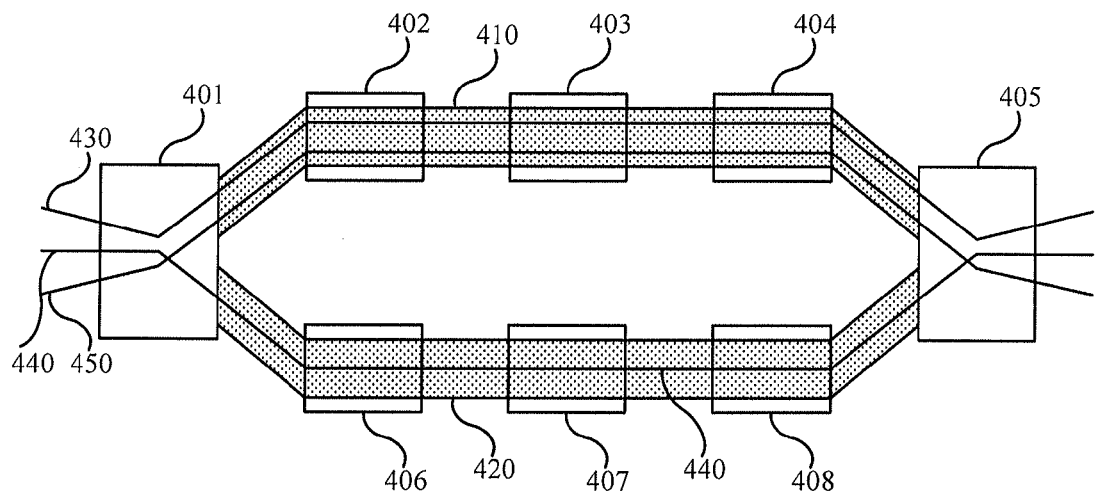
FIG. 6 is a schematic diagram of a protected transmission state in automatic protection switching network architecture according to an embodiment of the present invention.

Step 303: The first network edge node 401 switches the to-be-switched service, namely, the second service 440, from the first transmission path 410 to the second transmission path 420, and sends a partial switching message to the second network edge node 405 at the peer end of the second transmission path 420. The partial switching message carries at least indication information about the to-be-switched service, namely, priority value 4. A network transmission state after switching is as shown in FIG. 6. When the first network edge node 401 does not need to send the protected service from the second transmission path 420, the first network edge node generally sends a No Request (No Request, NR for short) message to the second transmission path 420; when protection switching is required, the partial switching message above is generated.

Step 304: After receiving the partial switching message transmitted from the second transmission path 420, the second network edge node 405 parses the partial switching message to obtain the indication information about the to-be-switched service, and switches the service with priority lower than priority value 4 according to the protection switching policy, that is, the second service 440 is switched from the first transmission path 410 to the second transmission path 420, so that bidirectional protection switching is complete. The protection switching policy may also include a switching rule. The switching rule includes at least an indication that instructs the second network edge node 405 to switch the services with priority lower than the specified priority value from the first transmission path 410 to the second transmission path 420.

The second network edge node 405 may pre-store the protection switching policy that is the same as the protection switching policy in the first network edge node 401, or receives the protection switching policy that is sent together with the partial switching message by the first network edge node 401.

Through the technical solution of this embodiment, when the bandwidth of the first transmission path decreases due to the AM of the microwave link, no signal degradation (Signal Degrade, SD for short) occurs, and merely the service with lower priority may be switched to the second transmission path, so that the decrease of the bandwidth of the first transmission path does not affect transmission of services with higher priority. The problem that transmission quality of the first transmission path is deteriorated due to the decrease of the bandwidth may be avoided by switching of a part of services. Moreover, the residual bandwidth of the first transmission path can further be fully used, thus avoiding affecting the transmission efficiency and quality of the original unprotected services on the second transmission path by too many protected services switched to the second transmission path. Meanwhile, the decrease of service switching volume can reduce packet loss caused by the switching. The protected services are reasonably distributed to the first transmission path and the second transmission path, and therefore, the load may be shared, and maximum protection is provided for the services.

Figure 7:
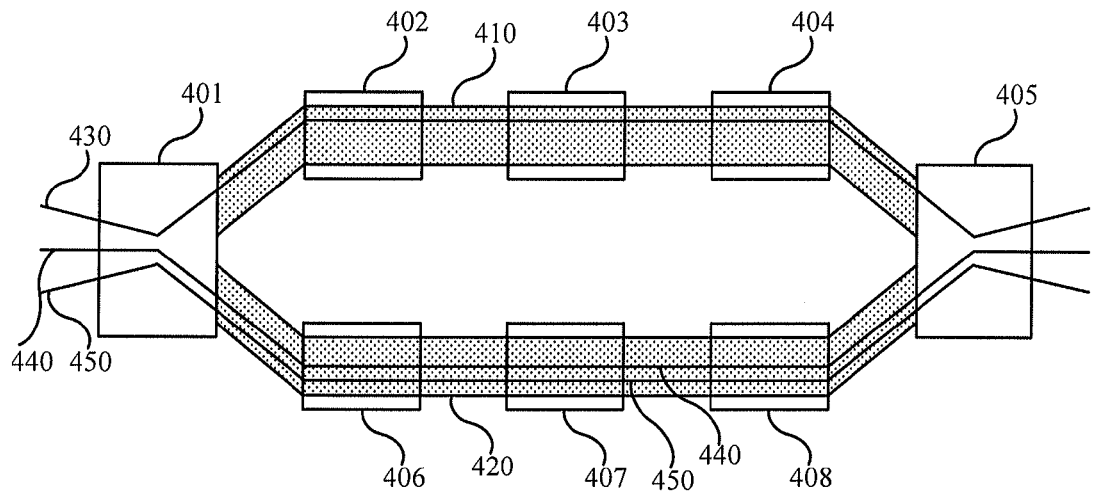
FIG. 7 is a schematic diagram of another protected transmission state in automatic protection switching network architecture according to an embodiment of the present invention.

In this embodiment, partial automatic protection switching of the service may be performed for more than once. After the partial automatic protection switching of the service is performed, if any network edge node monitors that the bandwidth decreases, for example, the bandwidth decreases from 0.6 Gbps to 0.3 Gbps, the corresponding priority value may be queried and determined, for example, the priority value is 6 when the bandwidth is 0.3 Gbps, and the third service 350 with the service priority being 5 is also switched to the second transmission path 420, as shown in FIG. 7.

Embodiment 4

Figure 8:
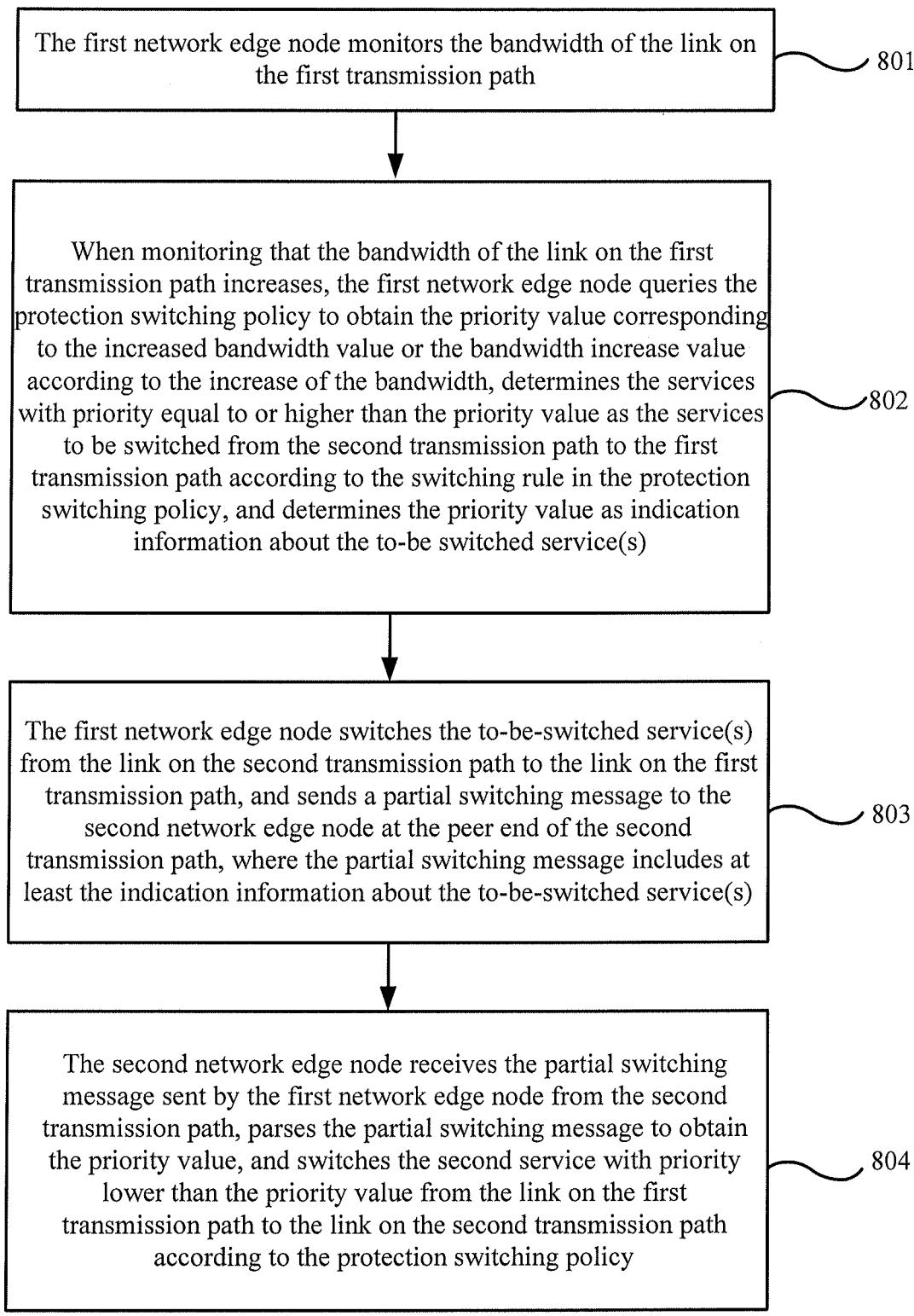
FIG. 8 is a flow chart of an automatic protection switching method according to Embodiment 4 of the present invention.

FIG. 8 is a flow chart of an automatic protection switching method according to Embodiment 4 of the present invention.

This embodiment differs from Embodiment 3 in that: Embodiment 3 shows the case that the service is switched from the first transmission path to the second transmission path when the bandwidth of the link on the first transmission path decreases; and this embodiment shows the case that the service is switched from the second transmission path to the first transmission path when the bandwidth of the link on the first transmission path increases. The detailed steps are as follows:

Step 801: The first network edge node 401 monitors the bandwidth of the link on the first transmission path 410.

Step 802: When monitoring that the bandwidth of the link on the first transmission path 410 increases, the first network edge node 401 queries the protection switching policy to obtain the priority value corresponding to the increased bandwidth value or the bandwidth increase value according to the increase of the bandwidth. The protection switching policy includes at least a mapping relationship between the increased bandwidth value or bandwidth increase value and the priority value, and includes a switching rule. The switching rule includes at least indication information of determining the services with priority equal to or higher than the priority value as the services to be switched from the second transmission path 420 to the first transmission path 410, and determining the priority value as indication information about the to-be switched service. According to the switching rule stored in the protection switching policy, the first network edge node 401 determines the service with priority equal to or higher than the priority value as a service to be switched from the second transmission path 420 to the first transmission path 410, and determines the priority value as indication information about the to-be-switched service. For example, when the bandwidth increases from 0.3 Gbps to 0.6 Gbps, the priority value is determined as 4, and the second service 440 with the service priority being 5 is determined as the to-be-switched service, and the priority value 4 is determined as the indication information about the to-be-switched service.

It should be noted that, for ease of description in this embodiment, merely a second service 440 is switched. In a practical network, more than one service may be switched. That is, all services with priority lower than a priority value are switched at the first network edge node 401, where the priority value is in the protection switching policy and corresponds to the changed bandwidth value.

Step 803: The first network edge node 401 switches the to-be-switched service(s) from links on the second transmission path 420 to the first transmission path 410, and sends a partial switching message to the second network edge node 405 at the peer end of the second transmission path 420. The partial switching message includes at least indication information about the to-be-switched service.

Step 804: The second network edge node 405 receives from the second transmission path 420 the partial switching message sent by the first network edge node 401, parses the partial switching message to obtain the priority value 4, and according to the protection switching policy, switches the second service 440 with service priority lower than the priority value from links on the first transmission path 410 to the second transmission path 420 for transmission. The protection switching policy may further include a switching rule. The switching rule includes at least an indication that instructs the second network edge node 405 to switch the services with priority lower than the specified priority value from the first transmission path 410 to the second transmission path 420.

It should be noted that, for ease of description in this embodiment, merely a second service 440 is switched. In a practical network, more than one service may be switched. That is, all services with priority lower than a priority value are switched at the second network edge node 405, where the priority value is obtained from the parsed partial switching message.

Through the technical solution of this embodiment, when the network edge node monitors that the bandwidth of the first transmission path changes due to AM of the microwave link, that a service is transmitted on which path may be controlled according to service priority. Therefore, the bandwidth resources are utilized reasonably; the packet loss caused by switching of all protected services is reduced; and efficiency and quality of network transmission can be improved.

Embodiment 5

Figure 9:
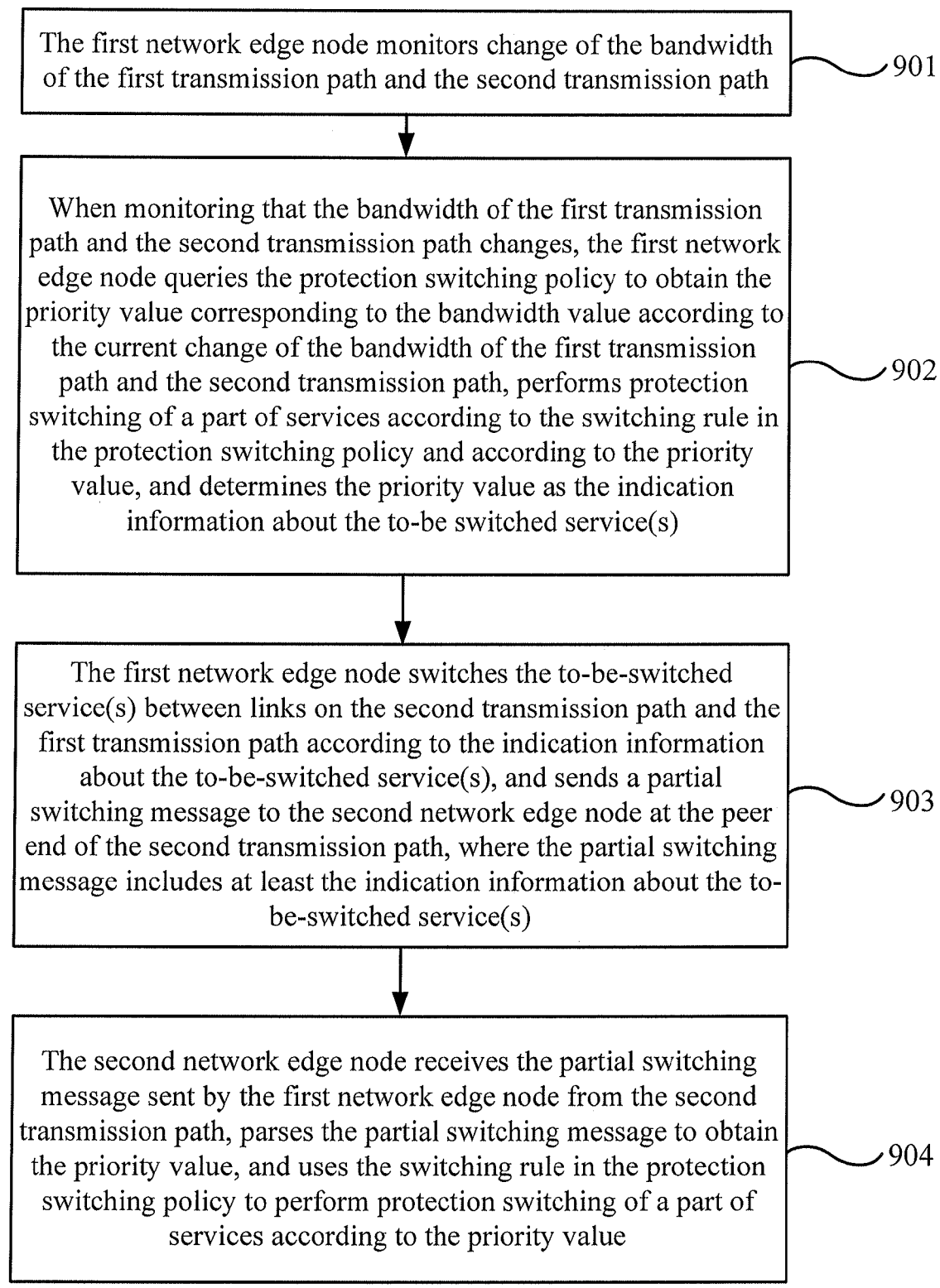
FIG. 9 is a flow chart of an automatic protection switching method according to Embodiment 5 of the present invention.

FIG. 9 is a flow chart of an automatic protection switching method according to Embodiment 5 of the present invention. This embodiment differs from Embodiment 3 and Embodiment 4 in that: Embodiment 3 and Embodiment 4 show a situation where merely the link bandwidth of the first transmission path is considered when the priority value of the switching is determined; in this embodiment, the priority value of the to-be-switched service(s) is determined with reference with the bandwidth of the first transmission path and the bandwidth of the second transmission path. In this embodiment, the network architecture shown in FIG. 4 is taken as an example for illustration.

Step 901: The first network edge node 401 monitors the bandwidth of the first transmission path 410 and the second transmission path 420. Specifically, the bandwidth of the microwave link between the first network edge node 401, the first intermediate node 402, and the fourth intermediate node 406 is monitored.

Step 902: When monitoring that the bandwidth of the first transmission path 410 and/or the second transmission path 420 changes or change simultaneously, the first network edge node 401 queries the protection switching policy to obtain the priority value corresponding to the bandwidth value according to the current change of the bandwidth of the first transmission path 410 and the second transmission path 420. The protection switching policy includes at least a mapping relationship between the changed bandwidth value or the bandwidth change value and the priority value, and includes the switching rule. The switching rule includes at least an indication that instructs the first network edge node 401 to perform protection switching for a part of services according to the priority value. That is, the service with priority equal to or higher than the priority value is determined as the service to be switched from the second transmission path 420 to the first transmission path 410; the service with priority lower than the priority value is determined as the service to be switched from the first transmission path 410 to the second transmission path 420; and the priority value is determined as indication information about the to-be-switched service(s). The first network edge node 401 performs protection switching for a part of services according to the switching rule in the protection switching policy and the priority value. That is, the service with priority equal to or higher than the priority value is determined as the service to be switched from the second transmission path 420 to the first transmission path 410; the service with priority lower than the priority value is determined as the service to be switched from the first transmission path 410 to the second transmission path 420; and the priority value is determined as indication information about the to-be-switched service(s).

Specifically, the protection switching policy may be pre-stored in the network edge node, and the priority value may be set according to the corresponding values of the bandwidth of first transmission path and the bandwidth of the second transmission path. For example, when the bandwidth of the first transmission path is 0.6 Gbps, and the bandwidth of the second transmission path is also 0.6 Gbps, the priority value is determined as 4 by querying the protection switching policy. Alternatively, the priority value may further be determined according to the increase value or decrease value of the bandwidth of the first transmission path. When the priority value is determined as 4, for the situation shown in FIG. 5, the second service 440 with the service priority 4 may be determined as a to-be-switched service, and the priority value 4 is determined as indication information about the to-be-switched service. Specifically, the to-be-switched service(s) may be identified in the first transmission path 410 and the second transmission path 420 respectively. When a service with priority lower than the priority value is identified in the first transmission path 410, the service is determined as a to-be-switched service, and is switched to the second transmission path 420; when a service with priority equal to or higher than the priority value is identified in the second transmission path 420, the service is determined as a to-be-switched service, and is switched to the first transmission path 410. Here, the number of the to-be-switched service(s) is one or more than one.

Step 903: The first network edge node 401 switches the to-be-switched service(s) between the link on the second transmission path 420 and the link on the first transmission path 410 according to the indication information about the to-be-switched service, and sends a partial switching message to the second network edge node 405 at the peer end of the second transmission path 420, where the partial switching message includes at least the indication information about the to-be-switched service.

Step 904: The second network edge node 405 receives the partial switching message sent by the first network edge node 401 from the second transmission path 420, parses the partial switching message to obtain the priority value 4, uses the switching rule in the protection switching policy, and performs protection switching for a part of services according to the priority value. That is, a service with priority lower than the priority value in the link of the first transmission path 410 is determined as a to-be-switched service and is switched to a link on the second transmission path 420 for transmission, and a service with priority equal to or higher than the priority value in the link of the second transmission path 420 is determined as a to-be-switched service and is switched to a link on the first transmission path 410 for transmission. The switching rule may be the same as or different from the switching rule in the first network edge node 401. For example, the protection switching may be performed for a part of services according to the priority value, that is, a service with priority lower than the priority value in the link of the first transmission path 410 is determined as a to-be-switched service and is switched to the link on the second transmission path 420, and a service with priority equal to or higher than the priority value in the link of the second transmission path 420 is determined as a to-be-switched service and is switched to the link on the first transmission path 410.

The second network edge node 405 may perform a step similar to step 902 above, identify the services in the first transmission path 410 and the second transmission path 420 according to the priority value first, determine the services that match the condition as to-be-switched service(s) according to the identification result, and switch the services between the first transmission path 410 and the second transmission path 420. Therefore, it is ensured that the service with lower priority is transmitted in the second transmission path 420, and the service with higher priority is transmitted in the first transmission path 410.

Through the technical solution of this embodiment, when the network edge node monitors that the bandwidth of the first transmission path changes due to AM of the microwave link, that a service is transmitted on which path may be controlled according to the service priority. Therefore, the bandwidth resources are utilized reasonably, the packet loss caused by switching of all protected services is reduced, and efficiency and quality of network transmission can be improved.

In practical applications, the switching protection policy is not limited to distinguishing the to-be-switched service(s) according to whether the service priority is greater or lower than a priority value, and the to-be-switched service(s) may also be identified directly according to a service identifier, or a list of service identifiers, or a service group identifier, or a packet priority value. For example, the services with a certain priority value or certain priority values are determined directly as services that should be switched to the second transmission path, and, if that these services are transmitted on the first transmission path is monitored, protection switching is performed. Specifically, in an MPLS network, multiple pseudowires may form a pseudowire group, and a group identifier is allocated to the pseudowire group. A label switching path may bear multiple pseudowire groups. When switching is performed, identifiers of one or more pseudowire groups that need to be switched are carried in an MPLS APS message, notifying the peer that the services in the/these pseudowire groups need to be switched to the second transmission path.

Embodiment 6

Figure 10:
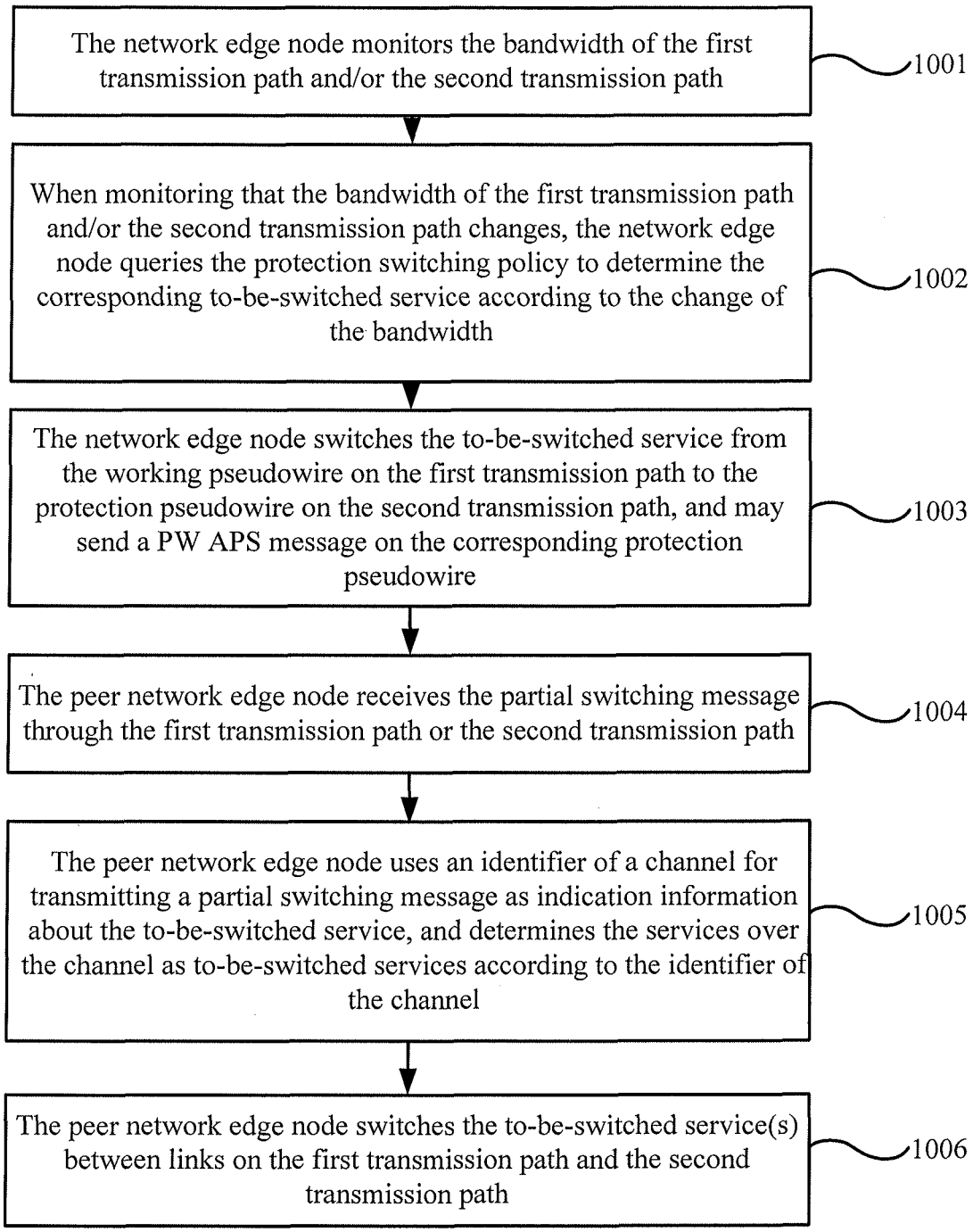
FIG. 10 is a flow chart of an automatic protection switching method according to Embodiment 6 of the present invention.

FIG. 10 is a flow chart of an automatic protection switching method according to Embodiment 6 of the present invention. In the forgoing embodiment, a path-layer APS message may be used to bear a partial switching message, thereby triggering partial protection switching. In this embodiment, a channel-layer APS message is used to trigger protection switching. Generally, a setting is specific to one or more services transmitted on a channel. Therefore, when a channel-layer APS message is used to trigger protection switching, the APS message does not need to carry the identifier or priority of the to-be-switched service, but an APS message is sent for to-be-switched service(s) transmitted on each channel. In this embodiment, a Multiple-Protocol label switching/pseudo wires (Multi-Protocol Label Switching/Pseudo Wires, MPLS/PW for short) network is taken as an example. The method includes the following steps:

Step 1001: The network edge node monitors the bandwidth of the first transmission path and/or the second transmission path. Specifically, it may be that the bandwidth of the microwave link of the network edge node is monitored directly.

Step 1002: When monitoring that the bandwidths of the first transmission path and/or the second transmission path changes or change simultaneously, the network edge node queries the protection switching policy to determine the corresponding to-be-switched service(s) according to bandwidth change. The protection switching policy includes at least a mapping relationship between the changed bandwidth value or the bandwidth change value and the to-be-switched service.

Step 1003: The network edge node switches the to-be-switched service(s) from the working pseudowire on the first transmission path to the protection pseudowire on the second transmission path for transmission, and may send a PW APS message, namely, a partial switching message, on the corresponding protection pseudowire, where the partial switching message carries identification information as an indication of switching the service on the channel to the protection pseudowire for transmission. The identifier of the channel for transmitting the PW APS message is the indication information about the to-be-switched service.

Step 1004: The peer network edge node of the network edge node receives the partial switching message through the first transmission path or the second transmission path.

Step 1005: The peer network edge node of the network edge node uses the identifier of the channel for transmitting the partial switching message as indication information about the to-be-switched service, and determines the services on the channel as to-be-switched service(s) according to the identifier of the channel.

Step 1006: The peer network edge node switches the to-be-switched service(s) between links on the first transmission path and the second transmission path.

In this embodiment, when receiving the corresponding PW APS message, the peer network edge node uses the identifier of the channel for transmitting the PW ASP message as indication information about the to-be-switched service(s), and determines the services over the working pseudowire of the channel as services that need to be switched to the protection pseudowire of the second transmission path. In this embodiment, the first transmission path may be a working path, and the second transmission path may be a protection path.

In this embodiment, the channel may refer to PW; for an MPLS label stack, the channel may also be an inner-layer LSP; for an Ethernet network, the channel may be a VLAN and a service instance identifier (Service Instance Identifier, I-SID for short).

Embodiment 7

Figure 11:
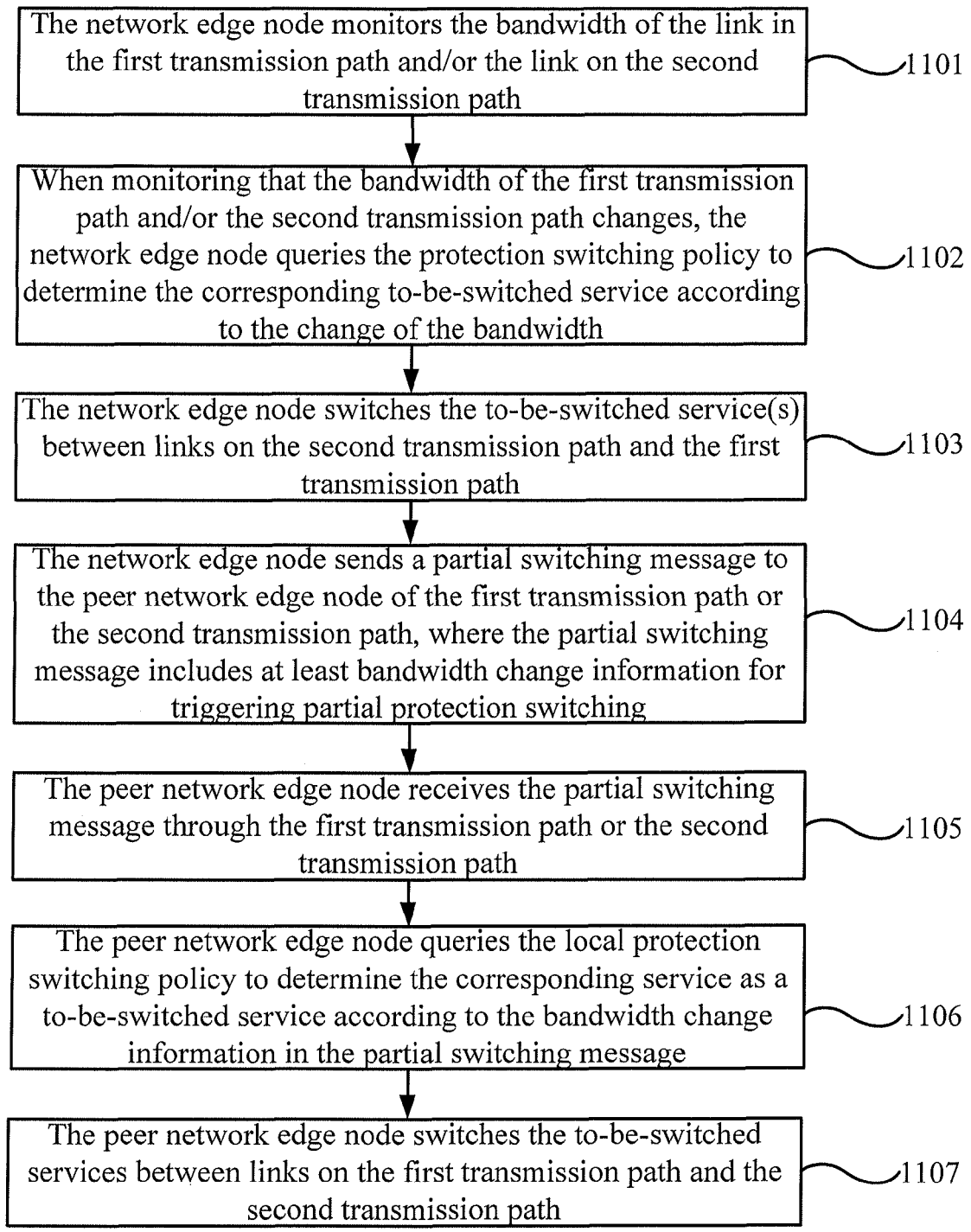
FIG. 11 is a flow chart of an automatic protection switching method according to Embodiment 7 of the present invention.

FIG. 11 is a flow chart of an automatic protection switching method according to Embodiment 7 of the present invention. The partial switching message transmitted in the forgoing embodiments carries indication information about the to-be-switched service. In this embodiment, the partial switching message carries a protection switching trigger condition that is capable of triggering partial protection switching. Specific steps includes the following:

Step 1101: The network edge node monitors the bandwidth of the link on the first transmission path and/or the second transmission path.

Step 1102: When monitoring that the bandwidth of the first transmission path and/or the second transmission path changes, the network edge node queries the protection switching policy to determine the corresponding to-be-switched service(s) according to bandwidth change. The protection switching policy includes at least a mapping relationship between the changed bandwidth value or the bandwidth change value and the to-be-switched service.

Step 1103: The network edge node switches the to-be-switched service(s) between links on the second transmission path and the first transmission path, and specifically, switches the path used for sending the services from the network edge node to the peer network edge node.

Step 1104: The network edge node sends a partial switching message to the network edge node at the peer end of the first transmission path or the second transmission path. The partial switching message includes at least bandwidth change information that is capable of triggering the partial switching, namely, a changed bandwidth value or a bandwidth change value of the first protection path and/or the second protection path. The bandwidth change information is used to instruct the peer network edge node to determine the to-be-switched service(s) according to the bandwidth change of the first protection path and/or the second protection path, and switch the to-be-switched service(s) between links on the second transmission path and the first transmission path.

Step 1105: The peer network edge node receives the partial switching message through the first transmission path or the second transmission path.

Step 1106: According to the bandwidth change information in the partial switching message, the peer network edge node queries the local protection switching policy to determine the corresponding service as the to-be-switched service. The bandwidth change information includes at least a bandwidth change value and/or a changed bandwidth value, and the protection switching policy includes at least a mapping relationship between the bandwidth change value and/or the changed bandwidth value and the to-be-switched service.

Step 1107: The peer network edge node switches the to-be-switched service(s) between links on the first transmission path and the second transmission path.

In this embodiment, the first transmission path may be a working path, and the second transmission path may be a protection path.

In this embodiment, the network edge node uses a partial switching message to trigger the peer network edge node to perform partial switching; and the peer network edge node self-determines the to-be-switched service(s) according to the local protection switching policy and the bandwidth change information of the first transmission path and/or the second transmission path. Specifically, the path used by the service sent by the peer network edge node itself is determined. The protection switching policies in the two network edge nodes may be the same or different, and the determined to-be-switched service(s) may be the same or different.

In this embodiment, adjusting distribution of the services on the first transmission path and the second transmission path refers to distributing different services onto the first transmission path or the second transmission path for transmission through a preset distribution algorithm. In an MPLS network, it may be that multiple pseudowires are distributed to the working LSP and the protection LSP; in an Ethernet network, it may be that multiple client VLANs are distributed to different operator VLAN tunnels or provider backbone bridge-traffic engineering (Provider Backbone Bridge-Traffic Engineering, PBB-TE for short) tunnels. Performing service adjustment may ensure normal transmission of the service to the utmost.

On the basis of the forgoing embodiments, when monitoring that the bandwidth of the first transmission path and/or the second transmission path changes, the network edge node may further determine a part of services on the first transmission path and/or the second transmission path as to-be-discarded services according to the change of bandwidth of the first transmission path and/or the second transmission path, and discard the to-be-discarded services. The discarding occurs mainly in the case that the bandwidth value decreases. Preferably, when the bandwidth required for transmitting the service exceeds the sum of the bandwidth of the first transmission path and the bandwidth of the second transmission path, a part of low-priority services may be determined as to-be-discarded services. The network edge node may further send an APS message to notify the peer network edge node of performing switching. The APS message carries information about the current bandwidth of the first transmission path and/or the second transmission path, so that the peer network edge node self-determines the to-be-discarded services according to bandwidth change. Definitely, the network edge node may also add identification information of these to-be-discarded services (information such as PW tag, VLAN tag, and service priority) into the APS message or other messages, and send the message to notify the peer network edge node, so as to ensure that the services discarded on both sides are consistent.

Embodiment 8

Figure 12:
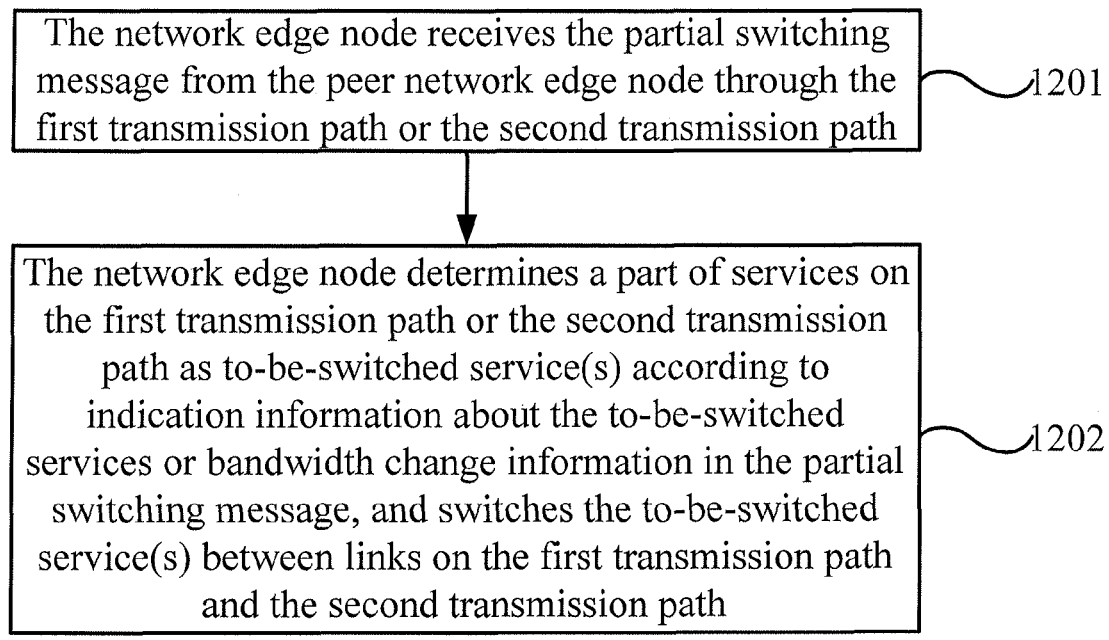
FIG. 12 is a flow chart of another automatic protection switching method according to Embodiment 8 of the present invention.

FIG. 12 is a flow chart of another automatic protection switching method according to Embodiment 8 of the present invention. This embodiment may be performed by a network edge node. In this embodiment, the first transmission path may be a working path, and the second transmission path may be a protection path. The method includes the following steps:

Step 1201: The network edge node receives a partial switching message from a peer network edge node of the network edge node through a first transmission path or a second transmission path. Specifically, the partial message may be received from the first transmission path, or may be received from the second transmission path. Preferably, the partial switching message is born in an APS message transmitted in the second transmission path.

Step 1202: The network edge node determines a part of services on the first transmission path or the second transmission path as to-be-switched service(s) according to indication information about the to-be-switched service(s) or bandwidth change information in the partial switching message, and switches the to-be-switched service(s) between links on the second transmission path and the first transmission path.

Through the technical solution of this embodiment, protection switching for a part of services may be implemented, which avoids that all services are switched. Therefore, a part of services may further be transmitted on the first transmission path, so that the switching traffic volume and the packet loss caused by the switching are reduced. In another aspect, the original transmission efficiency of the second transmission path is not affected by too many protected services transmitted on the second transmission path. The network edge node completes the corresponding switching operation when receiving a partial switching message, and may implement bidirectional switching of services.

The network edge node may serve as a sender or a receiver of the partial switching message when coordinating with a part of switching trigger nodes to complete the bidirectional switching of the service.

The indication information about the to-be-switched service(s) may be in multiple forms, for example, a service identifier, a service type, or proportion of services that need to be switched. The services may be selected randomly for switching according to the proportion.

Specifically, this embodiment may be implemented based on the network architecture shown in FIG. 4, and specifically may be performed by the second network edge node 405.

The second network edge node 405 receives a partial switching message sent by the first network edge node 401 from the second transmission path 420.

The second network edge node 405 parses the partial switching message to obtain the priority value as indication information about the to-be-switched service. For example, the indication information is the priority value 4.

The second network edge node 405 determines a service with priority lower than the priority value in the link of the first transmission path 410 as a to-be-switched service(s) according to the protection switching policy and the switching rule in the protection switching policy and switches the service to the link on the second transmission path 420 for transmission, and/or determines a service with priority equal to or higher than the priority value in the link of the second transmission path 420 as a to-be-switched service(s) and switches the service to the link on the first transmission path 410 for transmission. That is, as a receiver of the partial switching message, the second network edge node 405 may judge whether any service on the first transmission path 410 and the second transmission path 420 needs to be switched respectively according to the indication information. The protection switching policy includes at least the service priority of the to-be-switched service, and the switching rule includes at least an indication of determining a service with priority lower than the priority value in the link of the first transmission path 410 as a to-be-switched service(s) and switching the service to the link on the second transmission path 420 for transmission, and/or determining a service with priority equal to or higher than the priority value in the link of the second transmission path 420 as a to-be-switched service(s) and switching the service to the link on the first transmission path 410 for transmission.

In the forgoing embodiments of the present invention, the protection switching policy is not limited to determining the to-be-switched service(s) according to the priority value, and the current modulation level and bandwidth level information may further be used as a switching identifier for determining the to-be-switched service. Any indication information is appropriate so long as the service can be distinguished according to the bandwidth. The technical solution of the embodiments of the present invention is not limited to being applied in the PTN network shown in FIG. 4, but may be applied in other packet networks based on the APS technology, and is not limited to the 1:1 switching mode, but may use the 1:n or m:n switching mode. Any switching mode is appropriate so long as a part of services are switched between the first transmission path and the second transmission path according to change of the bandwidth.

In all embodiments described above, specifically, the service is switched when the service priority is lower than the priority value. In practical applications, however, the switching rule in the protection switching policy is not limited thereto. The service with priority higher than or equal to a set priority value may also be switched.

In practical applications, not only the first transmission path may use microwave links vulnerable to adaptive modulation, but also the second transmission path may employ microwave links vulnerable to adaptive modulation. Therefore, the switching trigger condition is not necessarily generated according to the state of the first transmission path, but may be obtained according to the state of the second transmission path, or the indication information such as priority value in the protection switching policy may be determined according to the state such as bandwidth of the first transmission path and the second transmission path.

In another automatic protection switching method provided in an embodiment of the present invention, step 1202 may include the following steps:

The network edge node uses an identifier of a channel for transmitting a partial switching message as indication information about the to-be-switched service, and determines the services over the channel as to-be-switched service(s) according to the identifier of the channel.

The network edge node switches the to-be-switched service(s) between links on the second transmission path and the first transmission path.

For detailed operations, reference may be made to the description in Embodiment 6.

In another automatic protection switching method provided in an embodiment of the present invention, step 1202 may include the following steps:

According to the bandwidth change information in the partial switching message, the network edge node queries the local protection switching policy to determine the corresponding service as the to-be-switched service. The protection switching trigger condition is preferably a bandwidth value of the first protection path and/or the second protection path, where the bandwidth value is monitored by the peer network edge node. The bandwidth change information includes at least a bandwidth change value and/or a changed bandwidth value, and the protection switching policy includes at least a mapping relationship between the bandwidth change value and/or the changed bandwidth value and the to-be-switched service.

The network edge node switches the to-be-switched service(s) between links on the second transmission path and the first transmission path.

For detailed operations, reference may be made to the description in Embodiment 7.

On the basis of the forgoing embodiments, after receiving the partial switching message from the peer network edge node through the first transmission path or the second transmission path, the network edge node may further determine a part of services on the first transmission path and/or the second transmission path as to-be-discarded services according to the bandwidth change information included in the partial switching message, and discard the to-be-discarded services. Preferably, the to-be-discarded service may be determined according to the bandwidth value monitored by the peer network edge node. The to-be-discarded services determined by both network edge nodes may be low-priority services, and may be the same or different.

Embodiment 9

Figure 13:
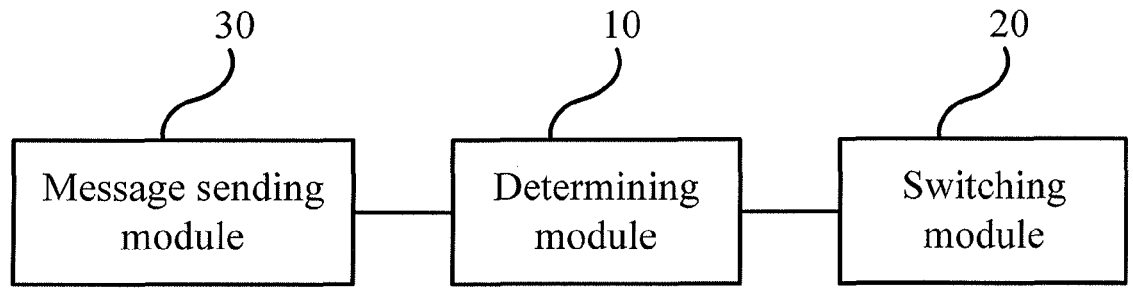
FIG. 13 is a schematic structure diagram of an automatic protection switching device according to Embodiment 9 of the present invention.

FIG. 13 is a schematic structure diagram of an automatic protection switching device according to Embodiment 9 of the present invention, including a determining module 10 and a switching module 20. The determining module 10 is configured to determine a part of services on a first transmission path or a second transmission path as to-be-switched service(s) according to change of bandwidth when monitoring that the bandwidth of the first transmission path changes; and the switching module 20 is configured to switch the to-be-switched service(s) between links on the second transmission path and the first transmission path.

The automatic protection switching device in this embodiment may be a stand-alone network element device or integrated in a network edge node of a packet network, may perform the automatic protection switching method provided in the embodiments of the present invention, and may determine a part of services from the protected services for switching between the second transmission path and the first transmission path, which implements that the load is distributed reasonably, and quality and efficiency of transmitting packets are improved.

Further, the automatic protection switching device may further include: a message sending module 30. The message sending module 30 may be connected to the determining module 10, and is configured to send a partial switching message to a network edge node at the peer end of the first transmission path or the second transmission path. The partial switching message includes at least indication information about the to-be-switched service(s) or bandwidth change information. Such information is used to instruct the peer network edge node to determine the to-be-switched service(s) according to the partial switching message and switch the to-be-switched service(s) between links on the second transmission path and the first transmission path. The network edge node at the peer end of the first transmission path or the second transmission path may be notified of performing the corresponding protection switching by sending a partial switching message, so as to implement bidirectional automatic protection switching of the service.

Embodiment 10

Figure 14:
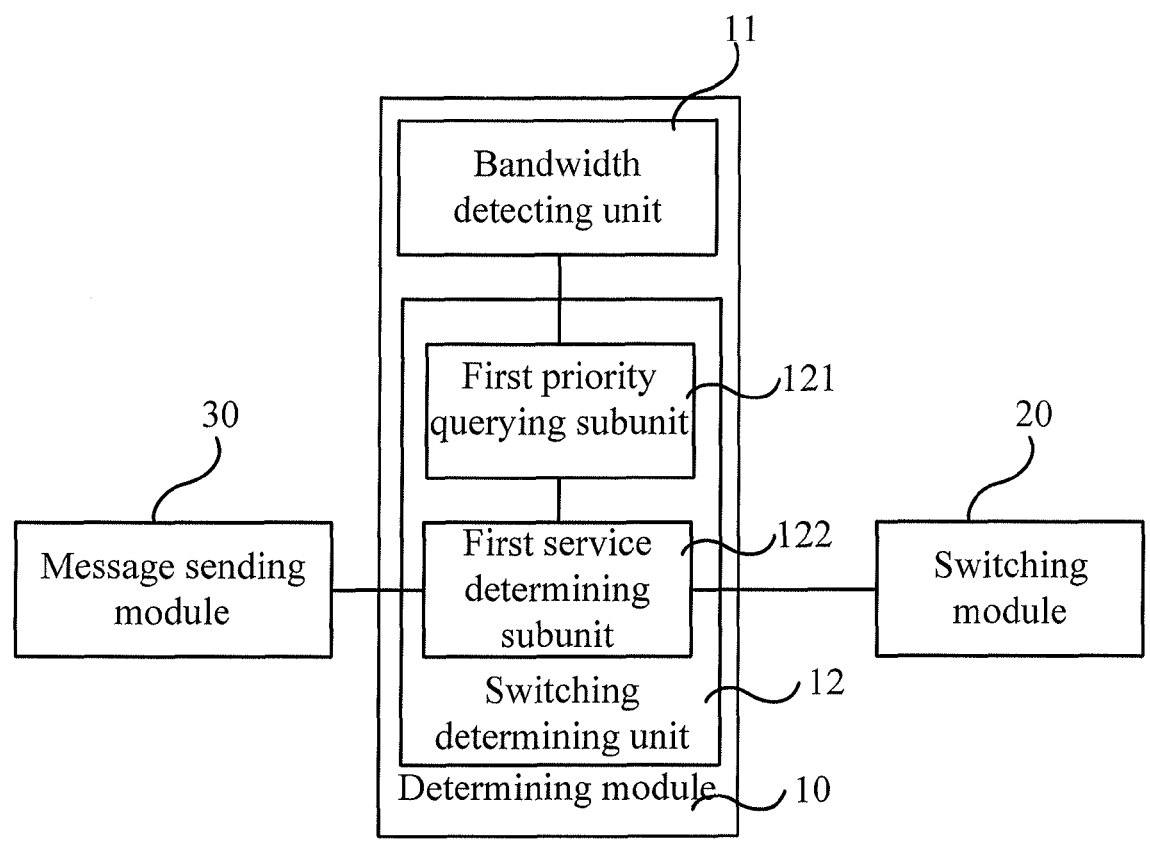
FIG. 14 is a schematic structure diagram of an automatic protection switching device according to Embodiment 10 of the present invention.

FIG. 14 is a schematic structure diagram of an automatic protection switching device according to Embodiment 10 of the present invention. This embodiment may be based on Embodiment 9. The determining module 10 includes a bandwidth monitoring unit 11 and a switching determining unit 12. The bandwidth monitoring unit 11 is configured to monitor bandwidth of the first transmission path; and the switching determining unit 12 is configured to determine a part of services on the first transmission path or the second transmission path as to-be-switched service(s) according to change of the bandwidth when monitoring that the bandwidth of the first transmission path changes, and determine indication information about the to-be-switched service(s) according to bandwidth change of the first transmission path.

This embodiment may perform the automatic protection switching method provided in an embodiment of the present invention, and determine the protected services that need to be switched according to the change of bandwidth. This embodiment is especially applicable to monitoring bandwidth change caused by adaptive modulation of the microwave link due to environment factors. At this time, although the bandwidth decreases, a part of bandwidth resources are still available.

On the basis of the foregoing technical solution, the switching determining unit 12 includes: a first priority querying subunit 121 and a first service determining subunit 122. The first priority querying subunit 121 is configured to query the protection switching policy to obtain the priority value corresponding to the decreased bandwidth value or the bandwidth decrease value according to the bandwidth decrease when monitoring that the bandwidth of the link on the first transmission path decreases. The protection switching policy includes at least a mapping relationship between the decreased bandwidth value or the bandwidth decrease value and the priority value. The first service determining subunit 122 is configured to determine the service with priority lower than the priority value as the service to be switched from the first transmission path to the second transmission path according to a switching rule in the protection switching policy, and determine the priority value as indication information about the to-be-switched service, where the switching rule includes at least an indication of determining the service with priority lower than the priority value as the service to be switched from the first transmission path to the second transmission path and determining the priority value as the indication information about the to-be-switched service.

Through the foregoing technical solution, the services may be distinguished by using service priority. When the bandwidth of the first transmission path decreases, a part of protected services with priority lower than the priority value are switched to the second transmission path, and therefore, the load is shared reasonably and the reliability of service transmission is ensured.

Embodiment 11

Figure 15:
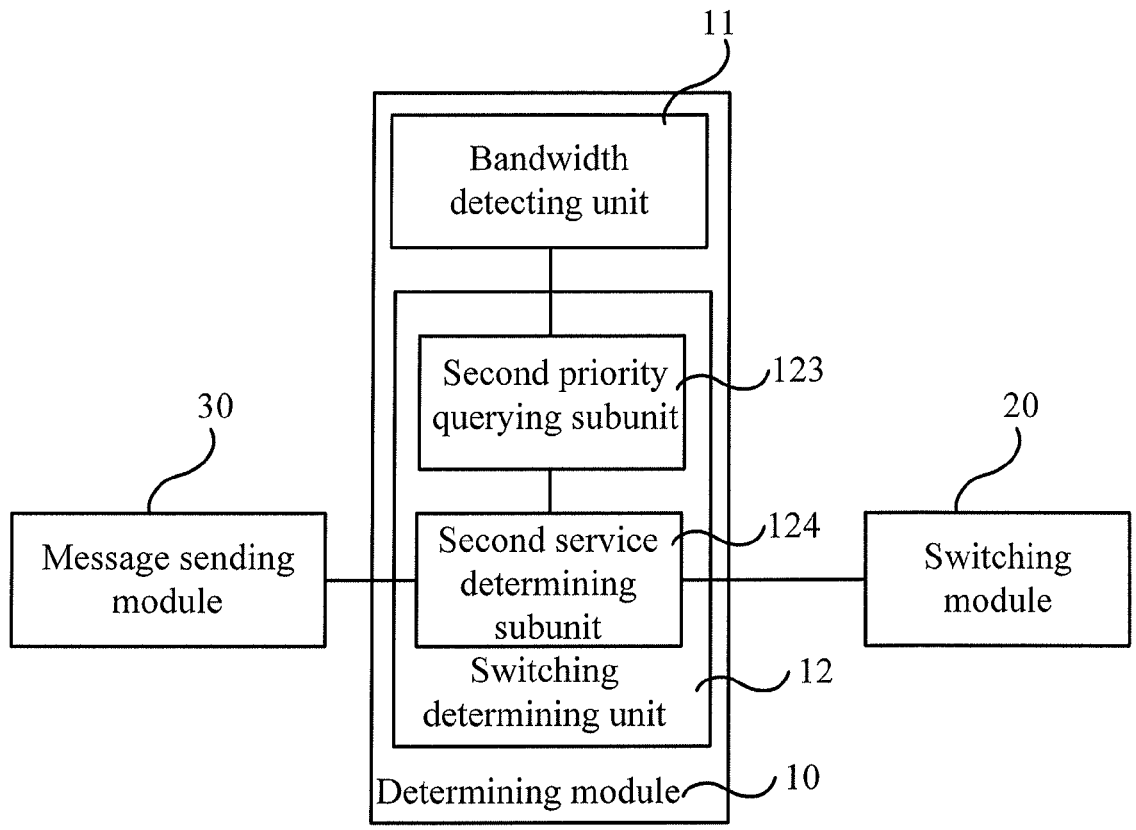
FIG. 15 is a schematic structure diagram of an automatic protection switching device according to Embodiment 11 of the present invention.

FIG. 15 is a schematic structure diagram of an automatic protection switching device according to Embodiment 11 of the present invention. This embodiment differs from Embodiment 10 in that the switching determining unit 12 includes: a second priority querying subunit 123 and a second service determining subunit 124. The second priority querying subunit 123 is configured to query the protection switching policy to obtain the priority value corresponding to the increased bandwidth value or the bandwidth increase value according to the bandwidth increase when monitoring that the bandwidth of the link on the first transmission path increases. The protection switching policy includes at least a mapping relationship between the increased bandwidth value or the bandwidth increase value and the priority value. The second service determining subunit 124 is configured to determine the service with priority equal to or higher than the priority value as the service to be switched from the second transmission path to the first transmission path according to a switching rule in the protection switching policy, and determine the priority value as indication information about the to-be-switched service, where the switching rule includes at least an indication of determining the service with priority equal to or higher than the priority value as the service to be switched from the second transmission path to the first transmission path and determining the priority value as the indication information about the to-be-switched service.

This embodiment specifically shows a partial protection switching situation that occurs when the bandwidth increases, and the switching determining unit may simultaneously include a first priority querying subunit, a first service determining subunit, a second priority querying subunit, and a second service determining subunit. Therefore, bidirectional switching of the protected services occurs between the first transmission path and the second transmission path according to the bandwidth change.

On the basis of the forgoing embodiment, the automatic protection device further includes a first discarding module, which is configured to determine a part of services on the first transmission path as to-be-discarded services according to the bandwidth change of the first transmission path, and discard the to-be-discarded services.

Embodiment 12

Figure 16:
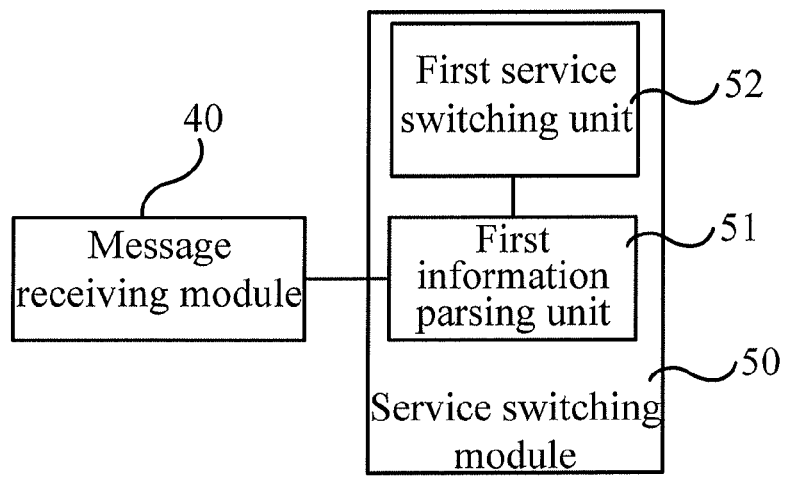
FIG. 16 is a schematic structure diagram of another automatic protection switching device according to Embodiment 12 of the present invention.

FIG. 16 is a schematic structure diagram of another automatic protection switching device according to Embodiment 12 of the present invention, including a message receiving module 40 and a service switching module 50. The message receiving module 40 is configured to receive a partial switching message from a peer network edge node through a first transmission path or a second transmission path; and the service switching module 50 is configured to determine a part of services on the first transmission path or the second transmission path as to-be-switched service(s) according to indication information about the to-be-switched service(s) or bandwidth change information in the partial switching message, and switch the to-be-switched service(s) between links on the second transmission path and the first transmission path.

The automatic protection switching device in this embodiment may be a stand-alone network element device or integrated in a network edge node of a packet network, may perform the automatic protection switching method provided in the embodiments of the present invention, and may determine a part of services from the protected services for switching between the second transmission path and the first transmission path, which implements that the load is distributed reasonably and quality and efficiency of transmitting packets are improved.

On the basis of the foregoing technical solution, the service switching module 50 may specifically include: a first information parsing unit 51 and a first service switching unit 52. The first information parsing unit 51 is configured to parse the partial switching message to obtain a priority value as indication information about the to-be-switched service; and the first service switching unit 52 is configured to determine a service with priority lower than the priority value in the link of the first transmission path as a to-be-switched service(s) according to the protection switching policy and the switching rule in the protection switching policy, and switch the service to the link on the second transmission path for transmission, and/or determine a service with priority equal to or higher than the priority value in the link of the second transmission path as a to-be-switched service(s) and switch the service to the link on the first transmission path for transmission. The protection switching policy includes at least the service priority of the to-be-switched service, and the switching rule includes at least an indication of determining a service with priority lower than the priority value in the link of the first transmission path as a to-be-switched service(s) and switching the service to the link on the second transmission path for transmission, and/or determining a service with priority equal to or higher than the priority value in the link of the second transmission path as a to-be-switched service(s) and switching the service to the link on the first transmission path for transmission.

Through the foregoing technical solution, the services may be distinguished through service priority, and the protected services with high priority are preferably switched to the protection path for transmission, and therefore, the load is shared properly and the reliability of service transmission is ensured.

Embodiment 13

Figure 17:
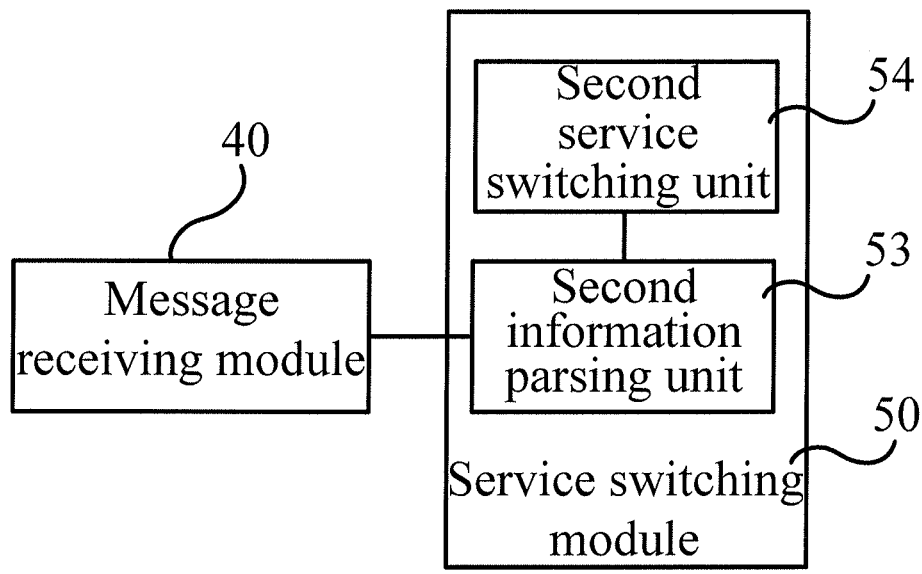
FIG. 17 is a schematic structure diagram of another automatic protection switching device according to Embodiment 13 of the present invention.

FIG. 17 is a schematic structure diagram of another automatic protection switching device according to Embodiment 13 of the present invention. This embodiment differs from Embodiment 12 in that the service switching module 50 includes: a second information parsing unit 53 and a second service switching unit 54. The second information parsing unit 53 is configured to use an identifier of a channel for transmitting the partial switching message as indication information about the to-be-switched service, and determine the services on the channel as to-be-switched service(s) according to the identifier of the channel; and the second service switching unit 54 is configured to switch the to-be-switched service(s) between links on the first transmission path and the second transmission path.

This embodiment may perform the technical solution of Embodiment 6 of the present invention. For the detailed working process, reference may be made to the description in the forgoing embodiments.

Embodiment 14

Figure 18:
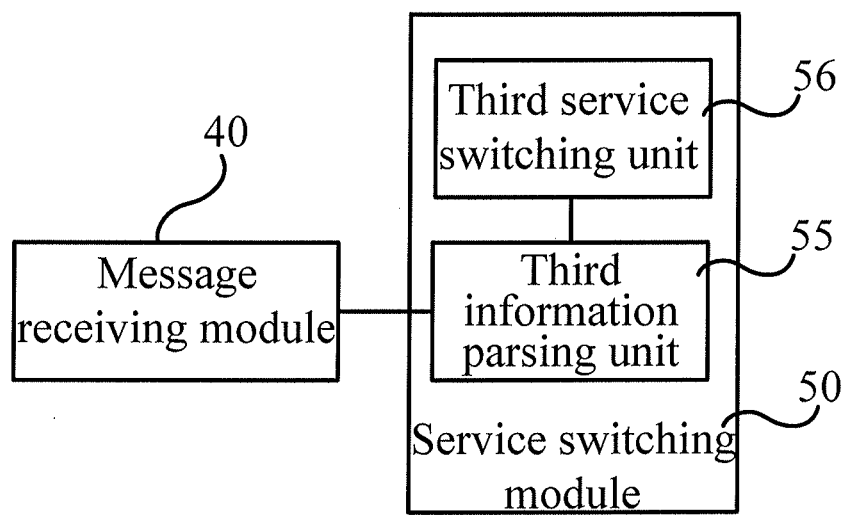
FIG. 18 is a schematic structure diagram of another automatic protection switching device according to Embodiment 14 of the present invention.

FIG. 18 is a schematic structure diagram of another automatic protection switching device according to Embodiment 14 of the present invention. This embodiment differs from Embodiment 12 in that the service switching module 50 includes: a third information parsing unit 55 and a third service switching unit 56. The third information parsing unit 55 is configured to query the local protection switching policy to determine the corresponding service as the to-be-switched service(s) according to the bandwidth change information in the partial switching message, where the bandwidth change information includes at least a bandwidth change value and/or a changed bandwidth value, and the protection switching policy includes at least a mapping relationship between the bandwidth change information and the to-be-switched service, and specifically, a mapping relationship between the bandwidth change value and/or the changed bandwidth value and the to-be-switched service. The third service switching unit 56 is configured to switch the to-be-switched service(s) between links on the first transmission path and the second transmission path.

This embodiment may perform the technical solution of Embodiment 7 of the present invention. For the detailed working process, reference may be made to the description in the forgoing embodiments.

On the basis of the forgoing embodiment, the automatic protection device may further include a second discarding module, which is configured to determine a part of services on the first transmission path as to-be-discarded services according to the bandwidth change information included in the partial switching message, and discard the to-be-discarded services.

Embodiment 15

For the structure of the automatic protection switching system provided in Embodiment 15, reference may be made to FIG. 4-FIG. 7. This system includes a first network edge node 401 and a second network edge node 405. Intermediate nodes exist between the first network edge node 401 and the second network edge node 405 to form a second transmission path 420 and a first transmission path 410. The first network edge node 401 is configured to: determine a part of services on the first transmission path 410 or the second transmission path 420 as to-be-switched service(s) according to change of bandwidth when monitoring that the bandwidth of the first transmission path 410 changes; switch the to-be-switched service(s) between a link on the second transmission path 420 and a link on the first transmission path 410; and send a partial switching message to the second network edge node 405 at the peer end of the first transmission path 410 or the second transmission path 420, where the partial switching message includes at least indication information about the to-be-switched service(s) or bandwidth change information. The second network edge node 405 is configured to: receive the partial switching message from the first network edge node 401 through the first transmission path 410 or the second transmission path 420; and determine a part of services on the first transmission path 410 or the second transmission path 420 as to-be-switched service(s) according to the indication information about the to-be-switched service(s) or bandwidth change information in the partial switching message, and switch the to-be-switched service(s) between the link on the first transmission path 410 and the link on the second transmission path 420.

The automatic protection switching system provided in this embodiment may include the two types of automatic protection switching devices provided in the embodiments of the present invention, and specifically may perform the automatic protection switching method provided in the embodiments of the present invention and switch a part of services between the first transmission path and the second transmission path, so that the load is distributed reasonably and quality and efficiency of transmitting packets are improved.

The technical solution of this embodiment is especially applicable to the situation where the first network edge node is connected to the intermediate node through a microwave link. When monitoring bandwidth change caused by adaptive modulation of the microwave link due to environment change, the first network edge node generates this protection switching trigger condition.

When the bandwidth change is caused by adaptive modulation of the microwave link due to environment change, bandwidth decrease does not mean that the signals are too degraded to transmit services, and a part of bandwidth is still available. Therefore, when the technical solution of this embodiment is applied in a microwave packet network, the bandwidth resources are fully utilized, and quality and efficiency of transmitting packets are improved.

Embodiment 16

Embodiment 16 does not indicate that only one embodiment may be included, but multiple embodiments may be included.

Embodiment 16 does not indicate that only one embodiment may be included, but multiple embodiments may be included.

FIG. 19-1 describes a diagram of a scenario of an automatic protection switching method according to Embodiment 16 of the present invention. In a network applying an APS technology, a protection group generally includes at least a first transmission path and a second transmission path. Both ends of the first transmission path and the second transmission path are converged to two protection switching nodes, which are generally network edge nodes. These two network edge nodes are configured with a transmitting/receiving selection apparatus, so as to implement protection switching, namely, to determine the path for transmitting the protected service. The method in this embodiment specifically may be performed by either network edge node. In this embodiment, "network edge node" and "peer network edge node" are used to distinguish between two different edge nodes; in a same way, "the network edge node" and "the peer network edge node" refer to the forgoing two edge nodes respectively. In this embodiment, two transmission paths: VP0 and VP1 are configured between the two edge nodes 1601 and 1605. The two transmission paths are a pair of protection groups. Protection switching policies are configured on the node 1601 and the node 1605. Therefore, the node 1601 and the node 1605 are protection switching nodes. Four traffic channels vc1, vc2, vc3, and vc4 have different priority levels, and are born on the two transmission paths. The CIRs of the four traffic channels are 100 Mbps, 50 Mbps, 150 Mbps, and 50 Mbps respectively. VP0 and VP1 pass through one or more adaptive bandwidth links such as microwave links. In this embodiment, microwave links exist between the node 1602 and the node 1603, and between the node 1606 and the node 1607. Because the bandwidth of these microwave links may change with the environment, the bandwidth allocated by the link to the VP0 and the VP1 may also change. However, generally the bandwidth change is not random, but is preset. In this embodiment, VP0 has 4 possible bandwidth values: 200 Mbps, 150 Mbps, 100 Mbps, and 50 Mbps; and VP1 has 3 possible bandwidth values: 200 Mbps, 150 Mbps, and 100 Mbps. In this way, from the viewpoint of the protection switching node (namely, edge node), VP0 and VP1 have 4*3=12 combinations of bandwidth. In this embodiment, the 12 bandwidth combinations are numbered into 12 path bandwidth states. As shown in FIG. 19-2, c1-c12 are an index of the path bandwidth states. It should be noted that, a same path bandwidth state index table needs to be configured on two protection switching nodes, namely, the node 1601 and the node 1605. In subsequent descriptions, the path allocation policy needs to be determined according to the path bandwidth state index, and c1-c12 may also be regarded as a channel allocation policy index. Therefore, the path bandwidth state index and the channel allocation policy index represent a same index, and have different names on different application occasions for ease of understanding. In a normal state, generally the transmission is performed according to the maximum bandwidth, and both VP0 and VP1 have a 200 Mbps capacity. Here, in an MPLS network, the transmission path is a label switching path, and the channel is a PW or nested inner-layer LSP. In an Ethernet, the transmission path may be a VLAN connection or PBB-TE connection, and the channel may be expressed as an inner-layer VLAN; in an OTN network, the transmission path may be a higher-order ODU cross-connect path, and the channel may be a lower-order ODU; in an SDH network, the transmission path may be a VC4 cross connection, and channel may be a lower-order VC, such as VC12.

FIG. 20 describes configuration of a channel allocation policy and channel allocation in a normal state. The channel allocation policy table is configured on two protection switching nodes 1601 and 1605, and describes a mapping relationship between the channel and the path under different path bandwidth states. In the channel allocation policy table, 0 and 1 are sequence numbers of the transmission paths, and correspond to VP0 and VP1 respectively; and D indicates that the corresponding service should be discarded. The cause for the discarding is generally that the bandwidth is not enough for bearing the service. The following uses two examples to explain the channel allocation policy table. The path bandwidth state c1 is taken as an example. In this path bandwidth state, the channel vc1 and the channel vc2 are allocated to be born on VP0, and the channel vc3 and the channel vc4 are allocated to be born on VP1. The path state c11 is taken as an example. vc1 and vc4 should be born on VP1; vc2 should be born on VP0; and vc3 will be discarded. Here c1-c12 correspond to different channel allocation policies respectively. Therefore, c1-c12 may also be called a channel allocation policy index. Because the channel generally corresponds to the service, the channel allocation policy index table here may also be called a service allocation index table, and accordingly, c1-c12 may also be called service allocation policy indexes. In FIG. 20, the protection switching node monitors that the bandwidth of VP0 and the bandwidth of VP1 are 200 Mbps, and therefore, the channels are allocated according to the policy corresponding to the bandwidth state c1.

Figure 21:
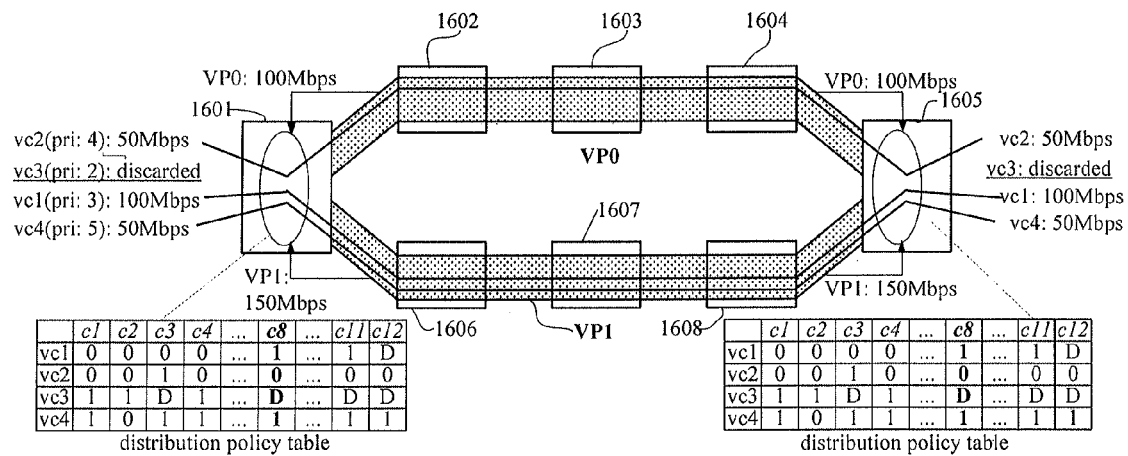
FIG. 21 is diagram of a scenario of protection switching when path bandwidth in FIG. 20 decreases.
Figure 22:
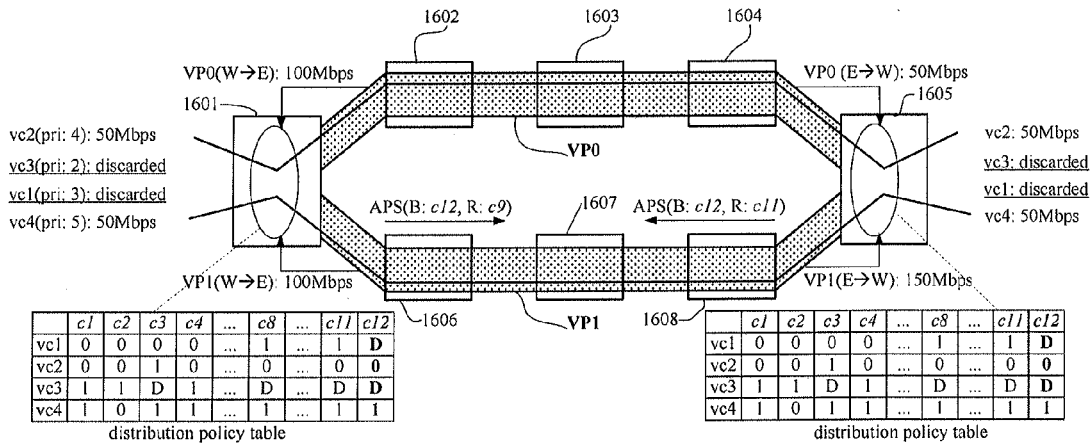
FIG. 22 is a diagram of a scenario of channel allocation according to another embodiment of the present invention.
Figure 23:
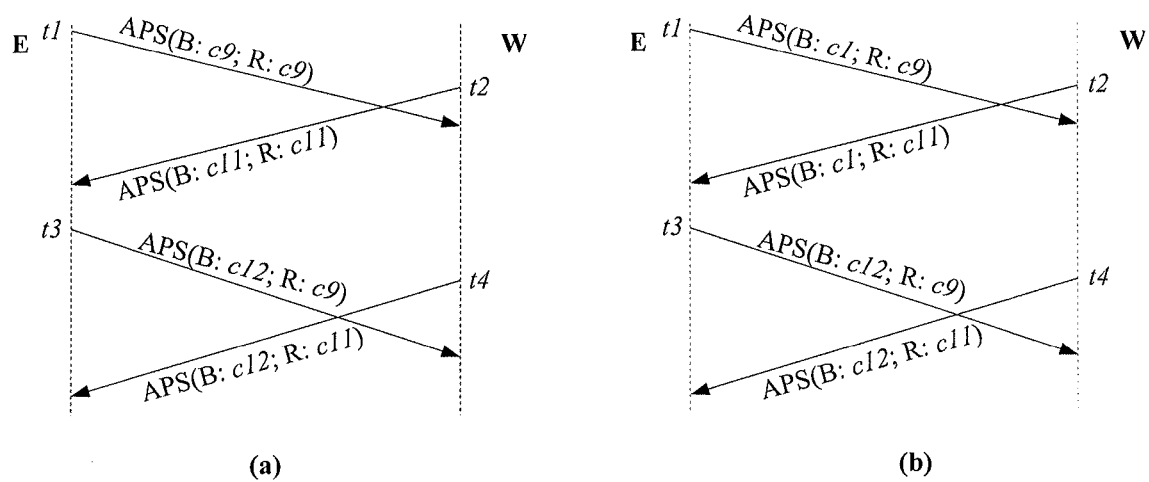
FIG. 23 is a procedure chart of processing an automatic protection switching message according to an embodiment of the present invention.

FIG. 21-FIG. 23 show a protection switching situation where the bandwidth decreases relative to FIG. 20. The protection switching includes the following steps:

Step 1901: When monitoring that the bandwidth of at least one transmission path in a protection group changes, the protection switching node determines a changed path bandwidth combination. The changed path bandwidth combination includes bandwidth of every transmission path in the protection group after the bandwidth changes; and the protection switching node stores a mapping relationship between the path bandwidth combination and the channel allocation policy on the path.

In this embodiment, a path may have multiple bandwidth combinations, and each bandwidth combination of the path may correspond to a channel allocation policy index. The protection switching node may store a path bandwidth state index table, where the path bandwidth state index includes a mapping relationship between the path bandwidth combination and the channel allocation policy index. The protection switching node in this embodiment further stores a mapping relationship between the path bandwidth combination and the channel allocation policy on the path. Because the path bandwidth combination corresponds to the channel allocation policy index, the protection switching node may store not only a bandwidth state index table, but also a channel allocation policy index table. The channel allocation policy index table includes a mapping relationship between the channel allocation index and the channel allocation on the path. After determining a bandwidth combination, the protection switching node may search the path bandwidth state index table for the corresponding channel allocation policy index, and then search the channel allocation policy index table for the channel allocation policy on the path corresponding to the channel allocation policy index.

In this step, the determining when monitoring that the bandwidth of at least one transmission path in a protection group changes, the determining the changed path bandwidth combination includes the following:

The protection switching node monitors the bandwidth of each transmission path, and determines the monitored changed bandwidth of each transmission path as the bandwidth of this transmission path when monitoring that the bandwidth of at least one transmission path changes; or:

The protection switching node monitors the bandwidth of each transmission path, and receives each transmission path's bandwidth monitored by the peer protection switching node at the same time, compares the each transmission path' bandwidth monitored by the network edge node with the each transmission path' bandwidth received by the peer network edge node, selects the smaller value as the bandwidth of the determined corresponding transmission path, and determines the changed path bandwidth combination accordingly.

Step 1902: The protection switching node queries the stored mapping relationship between the path bandwidth combination and the channel allocation policy on the path according to the changed path bandwidth combination, and determines the channel allocation policy under the changed path bandwidth state.

Step 1903: By switching the channel between paths in the protection group or discarding traffic of the channel directly, the protection switching node adjusts the current channel allocation policy to the channel allocation policy under the changed path bandwidth state.

Specifically, FIG. 21 describes an implementation mode of protection switching that occurs when the bandwidth decreases relative to FIG. 20:

Before the bandwidth changes, the current bandwidth of VP0 and the current bandwidth of VP1 are 200 Mbps; the channel allocation policy index is c1; in this path bandwidth state, the channel vc1 and the channel vc2 are allocated to be born on VP0, and the channel vc3 and the channel vc4 are allocated to be born on VP1. The network edge node 1601 obtains the changed bandwidth information. The bandwidth of VP0 decreases to 100 Mbps, and the bandwidth of VP1 decreases to 150 Mbps. The current path bandwidth state is: the bandwidth of VP0 is 100 Mbps and the bandwidth of VP1 is 150 Mbps. Through search in the path bandwidth state table according to the current path bandwidth state, the path bandwidth state index c8 is obtained; c8 is used as a channel allocation policy index to search the channel allocation policy table and to obtain the changed channel allocation policy: using VP1 to bear vc1 and vc4, using VP0 to bear vc2, and discarding vc3. The changed channel allocation policy is different from the current channel allocation policy, and therefore, the protection switching action is triggered: switching vc1 from VP0 to VP1, and discarding all traffic of vc3.

FIG. 21 describes a unidirectional switching mechanism, without involving automatic protection switching coordination between two protection switching nodes. In practice, an adaptive bandwidth link such as a microwave link has different frequencies in two directions of the link, and the impact caused by the external environment on the two directions also differs. In this way, the bandwidth in the two directions may be inconsistent, and in this case, two protection switching nodes may obtain different path bandwidth states, which may cause that the channel allocation policy differs between the two protection switching nodes. For the unidirectional switching policy, the foregoing processing is appropriate; however, for the bidirectional switching policy, it is required that the channel allocation policy on both sides should be exactly the same, and two protection switching nodes need to coordinate with each other. Specifically, FIG. 22 and FIG. 23 describe another implementation mode of protection switching that occurs when the bandwidth decreases relative to FIG. 20:

The protection switching node 1601 obtains the current west-to-east sending bandwidth: The bandwidth of VP0 is 100 Mbps, and the bandwidth of VP1 is 100 Mbps. According to the bandwidth state, the node 1601 searches out the path bandwidth state index as c9, and thus performs service switching according to the channel allocation policy corresponding to c9. The switching details are ignored here. Moreover, an APS message is sent to the protection switching node 1605. The request signals in the APS message carry the bandwidth state index value c9.

The protection switching node 1605 obtains the current east-to-west transmitting bandwidth. The bandwidth of VP0 is 50 Mbps, and the bandwidth of VP1 is 150 Mbps. According to the bandwidth state, the node 1605 searches out the path bandwidth state index as c11, and thus performs service switching according to the channel allocation policy corresponding to c11, switches vc1 from VP0 to VP1, and discards all traffic of vc3. Moreover, an APS message is sent to the protection switching node 1601. The request signals in the APS message carry the bandwidth state index value c11.

After receiving the APS message sent by the protection switching node 1601, the protection switching node 1605 searches a bandwidth state table based on the bandwidth state index value c9 carried in the APS message, and obtains the west-to-east path bandwidth state as follows: The bandwidth of VP0 is 100 Mbps, and the bandwidth of VP1 is 100 Mbps. The locally obtained east-to-west transmitting bandwidth is: the bandwidth of VP0 is 50 Mbps, and the bandwidth of VP1 is 150 Mbps. The minimum value of bandwidth of each path is selected to obtain new bidirectional bandwidth states as follows: The bandwidth of VP0 is 50 Mbps, and the bandwidth of VP1 is 100 Mbps. The bandwidth state table is searched to obtain the new path bandwidth state index c12; and the channel allocation table is searched to obtain the channel allocation policy corresponding to c12: using VP0 to bear vc2, using VP1 to bear vc4, and discarding vc1 and vc3. The protection switching node adjusts the channels according to this policy: discards the traffic of vc1 and vc3. Moreover, in the APS message sent to the protection switching node, the bridge signal value is updated to c12.

The protection switching node 1601 performs operations similar to the operations of the protection switching node 1605, and the detailed are not repeated here again.

FIG. 21 describes a protection switching situation that occurs when the bandwidth decreases relative to FIG. 20. The protection switching may further include the following step:

Step 2401: Monitor the bandwidth of the first transmission path and/or the second transmission path. When it is determined that the finally monitored bandwidth of the first transmission path and/or the finally monitored bandwidth of the second transmission path changes relative to the initial bandwidth of the first transmission path and/or the initial bandwidth of the second transmission path, the network edge node determines the finally monitored bandwidth of the first transmission path and/or the finally monitored bandwidth of the second transmission path as a final path bandwidth combination. The network edge node stores a mapping relationship between the path bandwidth combination and the channel allocation policy on the path.

In this embodiment, the determining that the finally monitored bandwidth of the first transmission path and/or the finally monitored bandwidth of the second transmission path changes relative to the initial bandwidth of the first transmission path and/or the initial bandwidth of the second transmission path may specifically be: comparing the finally monitored bandwidth of the first transmission path with the initial bandwidth of the first transmission path; comparing the finally monitored bandwidth of the second transmission path with the initial bandwidth of the second transmission path; and if either of the two comparison results shows that the two compared bandwidth values are different, namely, if the finally monitored bandwidth of the first transmission path is different from the initial bandwidth of the first transmission path, or the finally monitored bandwidth of the second transmission path is different from the initial bandwidth of the second transmission path, or the finally monitored bandwidth of the first transmission path and the finally monitored bandwidth of the second transmission path are different from the initial bandwidth of the first transmission path and the initial bandwidth of second transmission path, determining that the finally monitored bandwidth of the first transmission path and/or the finally monitored bandwidth of the second transmission path changes relative to the initial bandwidth of the first transmission path and/or the initial bandwidth of the second transmission path.

In this embodiment, a path may have multiple bandwidth combinations, and each bandwidth combination of the path may correspond to a channel allocation policy index. The network edge node may store a path bandwidth state index table, where the path bandwidth state index table includes a mapping relationship between the path bandwidth combination and the channel allocation policy index. The network edge node in this embodiment further stores a mapping relationship between the path bandwidth combination and the channel allocation policy on the path. Because the path bandwidth combination corresponds to the channel allocation policy index, the network edge node may store not only a bandwidth state index table, but also a channel allocation policy index table. The channel allocation policy index table includes a mapping relationship between the channel allocation index and the channel allocation on the path. After determining a bandwidth combination, the network node may search the path bandwidth state index table for the corresponding channel allocation policy index, and then search the channel allocation policy index table for the channel allocation policy on the path corresponding to the channel allocation policy index.

In this step, the network edge node monitors the bandwidth of the first transmission path and/or the second transmission path, and, when it is determined that the finally monitored bandwidth of the first transmission path and/or the finally monitored bandwidth of the second transmission path changes relative to the initial bandwidth of the first transmission path and/or the initial bandwidth of the second transmission path, the network edge node determines the finally monitored bandwidth of the first transmission path and/or the finally monitored bandwidth of the second transmission path as a final path bandwidth combination. This step includes the following:

24011: The network edge node monitors the bandwidth of the first transmission path and the second transmission path, determines the monitored bandwidth of the first transmission path as the finally monitored bandwidth of the first transmission path, and determines the monitored bandwidth of the second transmission path as the finally monitored bandwidth of the second transmission path; compares the initial bandwidth of the first transmission path with the finally monitored bandwidth of the first transmission path, and compares the initial bandwidth of the second transmission path with the finally monitored bandwidth of the second transmission path; and the network edge node determines the finally monitored bandwidth of the first transmission path and/or the finally monitored bandwidth of the second transmission path as a final path bandwidth combination when it is determined that the finally monitored bandwidth of the first transmission path and/or the finally monitored bandwidth of the second transmission path changes relative to the initial bandwidth of the first transmission path and/or the initial bandwidth of the second transmission path;

or,

24012: The network edge node monitors the bandwidth of the first transmission path and the second transmission path, and receives the first transmission path's bandwidth and the second transmission path's bandwidth monitored by the peer network edge node at the same time; compares the first transmission path's bandwidth monitored by the network edge node with the first transmission path's bandwidth received from the peer network edge node, and selects the smaller bandwidth value as the finally monitored bandwidth of the first transmission path; compares the second transmission path's bandwidth monitored by the network edge node with the second transmission path's bandwidth received from the peer network edge node, and selects the smaller bandwidth value as the finally monitored bandwidth of the second transmission path; compares the initial bandwidth of the first transmission path with the finally monitored bandwidth of the first transmission path, and compares the initial bandwidth of the second transmission path with the finally monitored bandwidth of the second transmission path; and the network edge node determines the finally monitored bandwidth of the first transmission path and/or the finally monitored bandwidth of the second transmission path as a final path bandwidth combination when it is determined that the finally monitored bandwidth of the first transmission path and/or the finally monitored bandwidth of the second transmission path changes relative to the initial bandwidth of the first transmission path and/or the initial bandwidth of the second transmission path;

or,

24013: The network edge node monitors the bandwidth of the first transmission path and the second transmission path, determines the monitored bandwidth of the first transmission path as the intermediate monitored bandwidth of the first transmission path, and determines the monitored bandwidth of the second transmission path as the intermediate monitored bandwidth of the second transmission path; compares the initial bandwidth of the first transmission path with the intermediate monitored bandwidth of the first transmission path, and compares the initial bandwidth of the second transmission path with the intermediate monitored bandwidth of the second transmission path; and the network edge node determines the intermediate monitored bandwidth of the first transmission path and/or the intermediate monitored bandwidth of the second transmission path as a final path bandwidth combination when it is determined that the intermediate monitored bandwidth of the first transmission path and/or the intermediate monitored bandwidth of the second transmission path changes relative to the initial bandwidth of the first transmission path and/or the initial bandwidth of the second transmission path; the network edge node queries the stored mapping relationship between the path bandwidth combination and the channel allocation policy on the path according to the intermediate path bandwidth combination, and determines the channel allocation policy on the path corresponding to the intermediate path bandwidth combination; judges whether the channel allocation policy corresponding to the intermediate path bandwidth combination is the same as the initial channel allocation policy, and, if the channel allocation policy corresponding to the intermediate path bandwidth combination is different from the initial channel allocation policy, performs channel switching according to the channel allocation policy corresponding to the intermediate path bandwidth combination; the network edge node receives the first transmission path's bandwidth and the second transmission path's bandwidth monitored by the peer network edge node, compares the first transmission path's bandwidth monitored by the network edge node with the first transmission path's bandwidth received from the peer network edge node, and selects the smaller bandwidth value as the finally monitored bandwidth of the first transmission path; compares the second transmission path's bandwidth monitored by the network edge node with the second transmission path's bandwidth received from the peer network edge node, and selects the smaller bandwidth value as the finally monitored bandwidth of the second transmission path; compares the intermediate monitored bandwidth of the first transmission path with the finally monitored bandwidth of the first transmission path, and compares the intermediate monitored bandwidth of the second transmission path with the finally monitored bandwidth of the second transmission path; and the network edge node determines the finally monitored bandwidth of the first transmission path and/or the finally monitored bandwidth of the second transmission path as a final path bandwidth combination when it is determined that the finally monitored bandwidth of the first transmission path and/or the finally monitored bandwidth of the second transmission path changes relative to the intermediate monitored bandwidth of the first transmission path and/or the intermediate monitored bandwidth of the second transmission path.

Step 2402: The network edge node queries the stored mapping relationship between the path bandwidth combination and the channel allocation policy on the path according to the final path bandwidth combination, and determines the channel allocation policy on the path corresponding to the final path bandwidth combination.

Step 2403: If the channel allocation policy corresponding to the final path bandwidth combination is different from the initial channel allocation policy, channel switching is performed according to the channel allocation policy corresponding to the final path bandwidth combination.

In this embodiment, the initial channel allocation policy may be the stored mapping relationship between the path bandwidth combination and the channel allocation policy on the path, and the channel allocation policy corresponding to the initial path bandwidth combination. The initial path bandwidth combination may be a combination of the initial bandwidth of the first transmission path and the initial bandwidth of the second transmission path.

Specifically, as regards the method of step 19031 for determining the final path bandwidth combination, before the bandwidth changes, the initial bandwidth of VP0 and the initial bandwidth of VP1 are 200 Mbps; the channel allocation policy index is c1; in this path bandwidth state, the channel vc1 and the channel vc2 are allocated to be born on VP0, and the channel vc3 and the channel vc4 are allocated to be born on VP1. FIG. 21 is taken as an example. The network edge node obtains the final bandwidth information. The bandwidth of VP0 decreases to 100 Mbps, and the bandwidth of VP1 decreases to 150 Mbps. The initial path bandwidth state is as follows: The bandwidth of VP0 is 100 Mbps and the bandwidth of VP1 is 150 Mbps. Through search in the path bandwidth state table according to the initial path bandwidth state, the path bandwidth state index c8 is obtained; c8 is used as an index to search the channel allocation policy index table and obtain the final channel allocation policy: using VP1 to bear vc1 and vc4, using VP0 to bear vc2, and discarding vc3. The final channel allocation policy is different from the initial channel allocation policy, and therefore, a protection switching action is enabled: switching vc1 from VP0 to VP1, and discarding all traffic of vc3.

The network edge node above is also called a protection switching node.

In the embodiments and the claims of this application, the concept of the protection switching node is equivalent to the concept of the network edge node, and both concepts may be exchanged with each other.

It should be noted that, for ease of description, this embodiment describes only the situation where merely two transmission paths are included in a protection group. However, a situation where more than two transmission paths are included in a protection group may exist, and, in this case, this protection switching method is still applicable so long as the relationship between the service and the channel under various bandwidth combinations is configured in the channel allocation policy table.

Persons of ordinary skill in the art may understand that, all or a part of the steps of the method according to the embodiments of the present invention may be implemented by a program instructing relevant hardware. The program may be stored in computer readable storage media. When the program runs, the steps of the method in the embodiments of the present invention are performed. The storage media may be any media capable of storing program codes, such as ROM, RAM, a magnetic disk, or an optical disk.

Finally, it should be noted that, the forgoing embodiments are merely provided for describing the technical solutions of the present invention, but are not intended to limit the present invention. Persons of ordinary skill in the art may understand that, although the present invention has been described in detail with reference to the forgoing embodiments, modifications or equivalent replacements may still be made to the technical solutions of the present invention, and these modifications or equivalent replacements do not cause the modified technical solutions to depart from the spirit and scope of the technical solutions of the present invention.

What is claimed is:

1. A protection switching method, wherein a protection group comprises a first protection switching node and a second protection switching node, and at least two transmission paths between the first protection switching node and the second protection switching node; a mapping relationship between a path bandwidth combination and a channel allocation policy is configured on the first protection switching node; and the path bandwidth combination is formed by bandwidths of the at least two transmission paths; the switching method comprises:

determining, by the first protection switching node, that the bandwidth of at least one of the transmission paths changes;

obtaining, by the first protection switching node, a final path bandwidth combination according to the bandwidth of the transmission path whose bandwidth changes, wherein the final path bandwidth combination is formed by bandwidths of the at least two transmission paths after the bandwidth of at least one transmission path changes;

querying, by the first protection switching node, the stored mapping relationship between the path bandwidth combination and the channel allocation policy according to the final path bandwidth combination, and determining the channel allocation policy corresponding to the final path bandwidth combination; and performing, by the first protection switching node, channel switching according to the channel allocation policy corresponding to the final path bandwidth combination.

2. The automatic protection switching method according to claim 1, wherein determining, that the bandwidth of at least one of the transmission paths changes comprises:

monitoring, by the first protection switching node, status of bandwidth of each transmission path in the protection group; and determining, by the first protection switching node, that the bandwidth of at least one of the transmission paths changes according to the monitoring result.

3. The automatic protection switching method according to claim 1, wherein determining, that the bandwidth of at least one of the transmission paths changes comprises:

receiving, by the first protection switching node, an Automatic Protection Switching message from the second protection switching node, wherein the Automatic Protection Switching message comprises status of bandwidth of at least one transmission path in the protection group; and determining, by the first protection switching node, that the bandwidth of at least one of the transmission paths changes according to the Automatic Protection Switching message.

4. The automatic protection switching method according to claim 1, wherein determining, that the bandwidth of at least one of the transmission paths changes comprises:

monitoring, by the first protection switching node, status of bandwidth of each transmission path in the protection group;

receiving, by the first protection switching node, an Automatic Protection Switching message from the second protection switching node, wherein the Automatic Protection Switching message comprises status of bandwidth of at least one transmission path in the protection group;

determining, by the first protection switching node, that the bandwidth of at least one of the transmission paths changes according to at least one of the monitoring result and the Automatic Protection Switching message.

5. The automatic protection switching method according to claim 1, wherein the transmission path is a label switching path, the channel is one of a Pseudowire or a nested inner-layer LSP.

6. The automatic protection switching method according to claim 1, wherein the transmission path is one of a Virtual Local Area Network (VLAN) connection or Provider Backbone Bridge-Traffic Engineering connection, and the channel is a inner-layer VLAN.

7. The automatic protection switching method according to claim 1, wherein the transmission path is a higher-order Optical channel Data Unit (ODU) cross-connect path, the channel is a lower-order ODU.

8. The automatic protection switching method according to claim 1, wherein the transmission path is a VC4 cross connection, the channel is a lower-order VC.

9. A computer program product comprising a non-transitory readable storage medium having a program code stored thereon for use by a first protection switching node, wherein a protection group comprises the first protection switching node and a second protection switching node, and at least two transmission paths between the first protection switching node and the second protection switching node; a mapping relationship between a path bandwidth combination and a channel allocation policy is configured on the first protection switching node; and the path bandwidth combination is formed by bandwidths of the at least two transmission paths, the program code comprising:

instructions for determining that the bandwidth of at least one of the transmission paths changes;

instructions for obtaining a final path bandwidth combination according to the bandwidth of the transmission path whose bandwidth changes, wherein the final path bandwidth combination is formed by bandwidths of the at least two transmission paths after the bandwidth of at least one transmission path changes;

instructions for querying the stored mapping relationship between the path bandwidth combination and the channel allocation policy according to the final path bandwidth combination, and determining the channel allocation policy corresponding to the final path bandwidth combination; and instructions for performing channel switching according to the channel allocation policy corresponding to the final path bandwidth combination.

10. The computer program product according to claim 9, wherein instructions for determining that the bandwidth of at least one of the transmission paths changes comprise:

instructions for monitoring status of bandwidth of each transmission path in the protection group; and instructions for determining that the bandwidth of at least one of the transmission paths changes according to the monitoring result.

11. The computer program product according to claim 9, wherein instructions for determining that the bandwidth of at least one of the transmission paths changes comprise:

instructions for receiving an Automatic Protection Switching message from the second protection switching node, wherein the Automatic Protection Switching message comprises status of bandwidth of at least one transmission path in the protection group; and instructions for determining that the bandwidth of at least one of the transmission paths changes according to the Automatic Protection Switching message.

12. The computer program product according to claim 9, wherein instructions for determining that the bandwidth of at least one of the transmission paths changes comprise:

instructions for monitoring status of bandwidth of each transmission path in the protection group;

instructions for receiving an Automatic Protection Switching message from the second protection switching node, wherein the Automatic Protection Switching message comprises status of bandwidth of at least one transmission path in the protection group;

instructions for determining that the bandwidth of at least one of the transmission paths changes according to the monitoring result and/or the Automatic Protection Switching message.

13. The computer program product according to claim 9, wherein the transmission path is a label switching path, the channel is one of a Pseudowire or a nested inner-layer LSP.

14. The computer program product according to claim 9, wherein the transmission path is one of a Virtual Local Area Network (VLAN) connection or Provider Backbone Bridge-Traffic Engineering connection, and the channel is a inner-layer VLAN.

15. The computer program product according to claim 9, wherein the transmission path is a higher-order Optical channel Data Unit (ODU) cross-connect path, the channel is a lower-order ODU.

16. The computer program product according to claim 9, wherein the transmission path is a VC4 cross connection, the channel is a lower-order VC.

* * * * *